US012605777B2

(12) United States Patent
Kantojarvi et al.

(10) Patent No.: US 12,605,777 B2
(45) Date of Patent: Apr. 21, 2026

(54) DOUBLE-SIDED CUTTING INSERT AND MILLING TOOL

(71) Applicant: SECO TOOLS AB, Fagersta (SE)

(72) Inventors: Fredrik Kantojarvi, Fagersta (SE); Johan Andersson, Fagersta (SE)

(73) Assignee: Seco Tools AB, Fagersta (SE)

( * ) Notice: Subject to any disclaimer, the term of this patent is extended or adjusted under 35 U.S.C. 154(b) by 610 days.

(21) Appl. No.: 18/031,069

(22) PCT Filed: Oct. 7, 2021

(86) PCT No.: PCT/EP2021/077658
§ 371 (c)(1),
(2) Date: Apr. 10, 2023

(87) PCT Pub. No.: WO2022/078863
PCT Pub. Date: Apr. 21, 2022

(65) Prior Publication Data
US 2023/0373020 A1 Nov. 23, 2023

(30) Foreign Application Priority Data
Oct. 13, 2020 (EP) .................................... 20201574

(51) Int. Cl.
*B23C 5/20* (2006.01)
*B23C 5/22* (2006.01)

(52) U.S. Cl.
CPC ............ *B23C 5/202* (2013.01); *B23C 5/2213* (2013.01); *B23C 2200/0483* (2013.01); *B23C 2200/0494* (2013.01); *B23C 2200/125* (2013.01)

(58) Field of Classification Search
CPC .......... B23C 2200/12; B23C 2200/121; B23C 2200/125; B23C 2200/128;
(Continued)

(56) References Cited

U.S. PATENT DOCUMENTS 6,142,716 A * 11/2000 Jordberg ................. B23C 5/202
407/115
9,144,848 B2 * 9/2015 Konta ..................... B23C 5/109
(Continued)

FOREIGN PATENT DOCUMENTS

EP 2596889 A1 5/2013
EP 3984672 A1 * 4/2022 ............. B23C 5/202
(Continued)

*Primary Examiner* — Nicole N Ramos
(74) *Attorney, Agent, or Firm* — Corinne R. Gorski

(57) ABSTRACT

A double-sided cutting insert for milling includes first and second major faces, a peripheral surface arranged between the major faces and including a first main side face, a first main cutting edge formed at an intersection between the first main side face and the first major face, a second main cutting edge formed at an intersection between the first main side face and the second major face, first and second inclined side surfaces, which are formed on the first main side face and which are inclined towards each other to form a depression on the first main side face, and a chip deflecting member formed on the first main side face as a protrusion across the depression and which includes a chip deflecting surface configured to deflect chips, which hit the first main side face, away from the depression.

17 Claims, 13 Drawing Sheets

(58) Field of Classification Search
CPC .... B23C 2200/0483; B23C 2200/0494; B23C
5/202; B23C 5/2213
See application file for complete search history.

(56) References Cited

U.S. PATENT DOCUMENTS

| 9,205,499 | B2 * | 12/2015 | Morrison | B23C 5/06 |
| 9,981,323 | B2 * | 5/2018 | Fang | B23C 5/2213 |
| 10,434,583 | B2 * | 10/2019 | Kister | B23C 5/2226 |
| 10,646,927 | B2 * | 5/2020 | Hecht | B23B 29/043 |
| 2009/0155005 | A1 * | 6/2009 | Jansson | B23C 5/06 |
| | | | | 407/114 |
| 2011/0305535 | A1 * | 12/2011 | Jansson | B23C 5/06 |
| | | | | 407/103 |
| 2012/0070239 | A1 * | 3/2012 | Park | B23C 5/06 |
| | | | | 407/42 |
| 2012/0076596 | A1 * | 3/2012 | Kim | B23C 5/202 |
| | | | | 407/69 |
| 2012/0301235 | A1 * | 11/2012 | Yoshioka | B23C 5/06 |
| | | | | 407/115 |
| 2013/0129432 | A1 * | 5/2013 | Jaeger | B23C 5/2213 |
| | | | | 407/42 |
| 2014/0212228 | A1 * | 7/2014 | Horiike | B23C 5/22 |
| | | | | 407/115 |
| 2014/0212229 | A1 | 7/2014 | Diepold | |
| 2014/0348599 | A1 | 11/2014 | Kovac et al. | |
| 2017/0259356 | A1 * | 9/2017 | Lee | B23C 5/2247 |
| 2018/0147642 | A1 * | 5/2018 | Takahashi | B23C 5/2213 |
| 2019/0240746 | A1 * | 8/2019 | Kitajima | B23C 5/202 |
| 2019/0283151 | A1 * | 9/2019 | Jansson | B23C 5/2213 |
| 2020/0376548 | A1 * | 12/2020 | Sterkenburg | B23B 27/148 |
| 2021/0060668 | A1 * | 3/2021 | Yoshida | B23C 5/202 |

FOREIGN PATENT DOCUMENTS

| WO | WO-2012102480 | A2 * | 8/2012 | | B23C 5/202 |
| WO | WO-2013180161 | A1 * | 12/2013 | | B23C 5/202 |
| WO | 2019201687 | A1 | 10/2019 | | |

* cited by examiner

DOUBLE-SIDED CUTTING INSERT AND MILLING TOOL

RELATED APPLICATION DATA

This application is a § 371 National Stage Application of PCT International Application No. PCT/EP2021/077658 filed Oct. 7, 2021 with priority to EP 20201574.9 filed on Oct. 13, 2020.

FIELD OF THE INVENTION AND PRIOR ART

The present invention relates to a double-sided cutting insert for milling and a milling tool including such a double-sided cutting insert.

A milling tool is a rotating cutting tool, which may be provided with one or more cutting inserts detachably mounted in a respective insert seat in a tool body of the milling tool. The cutting inserts may have a polygonal basic shape and may be provided with several identical cutting edges, to thereby allow each individual cutting insert to be turned into different working positions. When a cutting edge of a cutting insert has been worn out, the cutting insert may be repositioned in its insert seat and mounted in a new working position with another cutting edge in an active cutting position. Such a cutting insert may for instance have the form of a double-sided cutting insert with one or more main cutting edges located along the periphery of a first major face of the cutting insert and with one or more corresponding main cutting edges located along the periphery of an opposite second major face of the cutting insert, wherein the first and second major faces serve as top and bottom faces of the cutting insert.

Double-sided cutting inserts of the above-mentioned type are previously known in various configurations and examples of such cutting inserts are for instance disclosed in US 2014/0212229 A1 and EP 2 596 889 A1.

OBJECT OF THE INVENTION

The object of the present invention is to provide a double-sided cutting insert of the above-mentioned type that has a new and favourable design.

SUMMARY OF THE INVENTION

The double-sided cutting insert according to the invention has a polygonal basic shape and is turnable into different working positions and comprises:
- first and second major faces arranged on opposite sides of the cutting insert and serving as top and bottom faces of the cutting insert, each one of the first and second major faces having a polygonal shape as seen in a plan view of the cutting insert;
- a centre axis extending between the first and second major faces;
- a peripheral surface extending around the cutting insert between the first and second major faces and comprising at least a first main side face, which forms a first peripheral side of the cutting insert;
- a first main cutting edge formed at an intersection between the first main side face and the first major face;
- a second main cutting edge formed at an intersection between the first main side face and the second major face;
- a first inclined side surface and a second inclined side surface formed on the first main side face, wherein the first inclined side surface is located between the first major face and the second inclined side surface and is configured to form a relief surface for the first main cutting edge in a first one of said working positions and the second inclined side surface is located between the second major face and the first inclined side surface and is configured to form a relief surface for the second main cutting edge in a second one of said working positions, the first inclined side surface being inclined inwards as seen in a direction from a first edge of the first inclined side surface facing the first major face towards an opposite second edge of the first inclined side surface facing the second inclined side surface and the second inclined side surface being inclined inwards as seen in a direction from a first edge of the second inclined side surface facing the second major face towards an opposite second edge of the second inclined side surface facing the first inclined side surface, wherein the first and second inclined side surfaces are located opposite each other and are inclined towards each other to thereby form a depression on the first main side face between the first and second main cutting edges; and
- a first chip deflecting member formed on the first main side face as a protrusion extending across the depression formed by the first and second inclined side surfaces, wherein the first chip deflecting member has a first end facing the first main cutting edge, an opposite second end facing the second main cutting edge and at least a first chip deflecting surface that extends between said first and second ends and that is configured to deflect chips that hit the first main side face away from said depression, and wherein each one of the first and second inclined side surfaces comprises a first sub surface located on a first side of the first chip deflecting member and a second sub surface located on an opposite second side of the first chip deflecting member.

The first and second sub surfaces of the first inclined side surface are preferably arranged in the same plane. The first and second sub surfaces of the second inclined side surface are preferably arranged in the same plane.

The above-mentioned polygonal basic shape of the cutting insert implies that the cutting insert, as seen in the circumferential direction, has several different and distinct sides, which are connected to each other via intermediate corner areas and which together with each other and with the intermediate corner areas form the peripheral surface of the cutting insert. Thus, the polygonal basic shape of the cutting insert implies that the body of the cutting insert, when seen in a cross-section perpendicular to the centre axis of the cutting insert, has a shape that is non-circular and non-elliptical.

When the cutting insert is mounted in an insert seat in a tool body of a milling tool with the cutting insert positioned in the above-mentioned first working position, the first main cutting edge is positioned to form an active main cutting edge in the milling tool and the first inclined side surface is positioned to form a relief surface for this active main cutting edge. When the cutting insert is mounted in the insert seat with the cutting insert positioned in the above-mentioned second working position, the second main cutting edge is positioned to form an active main cutting edge in the milling tool and the second inclined side surface is positioned to form a relief surface for this active main cutting edge. In both of these working positions, the first main side face with the first and second inclined side surfaces is facing radially outward in the tool body, which implies that chips produced by the rotating milling tool during the milling of a workpiece may scratch the first main side face during that part of each revolution when the active main cutting edge is in contact with the workpiece or that the chips or the chip formed by the active main cutting edge may hit the first main side face at the moment when the active main cutting edge comes out of contact with the workpiece. The chips that hit the first main side face may cause detrimental erosion of the inclined side surface closest to the inactive main cutting edge and may also damage the inactive main cutting edge. The damages to the inactive main cutting edge may decrease the useful life of the cutting insert and may in worst case make a later use of the inactive main cutting edge impossible. If the inclined side surface closest to the inactive main cutting edge is configured to serve as an abutment surface of the cutting insert in another working position of the cutting insert and abut against a corresponding support surface in the insert seat in the tool body, an extensive erosion of this inclined side surface may cause inappropriate mounting of the cutting insert in the insert seat when the cutting insert is later positioned in a working position with the eroded inclined side surface as an active abutment surface. The above-mentioned chip deflecting member will deflect chips that hit the first main side face away from the inclined side surface closest to the inactive main cutting edge and will thereby reduce the erosion of this inclined side surface and reduce the damages to the inactive main cutting edge caused by the chips.

The above-mentioned centre axis of the cutting insert extends between a centre point of the first major face and a centre point of the second major face. By a centre point is meant a centroid or a geometric centre. The cutting insert may be provided with a through hole, which extends centrally through the cutting insert between the first and second major faces, wherein a centre axis of the through hole coincides with the centre axis of the cutting insert.

According to an embodiment of the invention, the first chip deflecting member comprises a second chip deflecting surface and a third chip deflecting surface arranged on opposite sides of the first chip deflecting surface, wherein the second chip deflecting surface is inclined outwards from the first chip deflecting surface and adjoins to the first sub surface of the first inclined side surface and to the first sub surface of the second inclined side surface, and wherein the third chip deflecting surface is inclined outwards from the first chip deflecting surface and adjoins to the second sub surface of the first inclined side surface and to the second sub surface of the second inclined side surface. The inclined second and third chip deflecting surfaces will assist the first chip deflecting surface in deflecting chips that hit the first main side face away from the depression formed by the first and second inclined side surfaces.

Another embodiment of the invention is characterized in:
that the first chip deflecting surface has a first longitudinal edge extending between the first and second ends of the first chip deflecting member and an opposite second longitudinal edge extending between the first and second ends of the first chip deflecting member;
that the second chip deflecting surface adjoins to and extends all along the first longitudinal edge of the first chip deflecting surface; and
that the third chip deflecting surface adjoins to and extends all along the second longitudinal edge of the first chip deflecting surface. The first, second and third chip deflecting surfaces may hereby cover all the external and exposed sides of the first chip deflecting member.

In order to adapt to the shape of the depression formed by the first and second inclined side surfaces, the first chip deflecting surface may have the shape of a parallelogram and the second and third chip deflecting surfaces may be triangular.

According to another embodiment of the invention, the first main side face has 180° rotational symmetry about an imaginary reference axis that extends through a centre point of the first main side face and perpendicularly to the centre axis of the cutting insert.

Another embodiment of the invention is characterized in:
that the relief surface formed by the first inclined side surface in said first working position is configured to serve as a secondary relief surface for the first main cutting edge, wherein a first primary relief surface is formed on the first main side face, the first primary relief surface adjoining to the first main cutting edge and being located between the first main cutting edge and the first inclined side surface to thereby serve as a primary relief surface for the first main cutting edge in said first working position; and
that the relief surface formed by the second inclined side surface in said second working position is configured to serve as a secondary relief surface for the second main cutting edge, wherein a second primary relief surface is formed on the first main side face, the second primary relief surface adjoining to the second main cutting edge and being located between the second main cutting edge and the second inclined side surface to thereby serve as a primary relief surface for the second main cutting edge in said second working position. In this case, the first chip deflecting surface preferably adjoins to the first primary relief surface at the first end of the first chip deflecting member and to the second primary relief surface at the second end of the first chip deflecting member, which implies that the gap between the first and second primary relief surfaces formed by the above-mentioned depression is spanned by the first chip deflecting member. Hereby, the first chip deflecting member may efficiently deflect chips that hit the first main side face away from the depression between the first and second primary relief surfaces.

According to another embodiment of the invention, the cutting insert has a median plan that extends halfway between the first and second major faces perpendicularly to the centre axis of the cutting insert, wherein each one of the first and second primary relief surfaces is perpendicular to this median plan, as seen in a section across the first and second primary relief surfaces in parallel with a central plane of the cutting insert that contains the centre axis of the cutting insert and a centre point of the first main side face. The first primary relief surface may as an alternative be inclined outwards as seen in a direction from a first longitudinal edge of the first primary relief surface facing or coinciding with the first main cutting edge towards an opposite second longitudinal edge of the first primary relief surface facing the first inclined side surface, wherein the second primary relief surface is inclined outwards as seen in a direction from a first longitudinal edge of the second primary relief surface facing or coinciding with the second main cutting edge towards an opposite second longitudinal edge of the second primary relief surface facing the second inclined side surface. Both of these alternatives imply that the primary relief surface associated with the active main cutting edge will give a contribution to the chip discharging of the cutting insert.

According to another embodiment of the invention, the cutting insert is provided with a through hole, which extends centrally through the cutting insert between the first and second major faces, wherein a centre axis of the through hole coincides with the centre axis of the cutting insert. In this case, the first chip deflecting member is preferably arranged at the centre of the first main side face, which implies that the first chip deflecting member is arranged on the first main side face at the area where the thickness of the wall between the through hole and the first main side face normally has its minimum. The first chip deflecting member contributes to a local increase of the thickness of the wall between the through hole and the first main side face and thereby acts as a reinforcement on the cutting insert. This reinforcement makes it possible to reduce certain dimensions of the cutting insert without jeopardizing the strength thereof.

According to another embodiment of the invention, the first chip deflecting surface is crossed by the above-mentioned central plane along a line of intersection that extends all the way between the first and second ends of the first chip deflecting member. It is hereby ensured that the first chip deflecting member, in its entire length, will give an efficient contribution to a reinforcement of the cutting insert.

Another embodiment of the invention is characterized in:
that the peripheral surface comprises a second main side face, which forms a second peripheral side of the cutting insert;
that a third main cutting edge is formed at an intersection between the second main side face and the first major face;
that a fourth main cutting edge is formed at an intersection between the second main side face and the second major face;
that a third inclined side surface and a fourth inclined side surface are formed on the second main side face, wherein the third inclined side surface is located between the first major face and the fourth inclined side surface and is configured to form a relief surface for the third main cutting edge in a third one of said working positions and the fourth inclined side surface is located between the second major face and the third inclined side surface and is configured to form a relief surface for the fourth main cutting edge in a fourth one of said working positions, the third inclined side surface being inclined inwards as seen in a direction from a first edge of the third inclined side surface facing the first major face towards an opposite second edge of the third inclined side surface facing the fourth inclined side surface and the fourth inclined side surface being inclined inwards as seen in a direction from a first edge of the fourth inclined side surface facing the second major face towards an opposite second edge of the fourth inclined side surface facing the third inclined side surface, wherein the third and fourth inclined side surfaces are located opposite each other and are inclined towards each other to thereby form a depression on the second main side face between the third and fourth main cutting edges;
that the cutting insert comprises a second chip deflecting member formed on the second main side face as a protrusion extending across the depression formed by the third and fourth inclined side surfaces, wherein the second chip deflecting member has a first end facing the third main cutting edge, an opposite second end facing the fourth main cutting edge and at least a first chip deflecting surface that extends between said first and second ends of the second chip deflecting member and that is configured to deflect chips that hit the second main side face away from the depression formed by the third and fourth inclined side surfaces; and
that each one of the third and fourth inclined side surfaces comprises a first sub surface located on a first side of the second chip deflecting member and a second sub surface located on an opposite second side of the second chip deflecting member.

In this case, the cutting insert has at least four different working positions. An increase in the number of possible working positions for the cutting insert also results in an increase of the useful life of the cutting insert. In order to achieve a double-sided cutting insert with four or more working positions, the cutting insert preferably has $360°/n$ rotational symmetry about the centre axis of the cutting insert, where n is an integer having a value of 2 or higher, preferably a value of 2, 3, 4, 5, 6, 7 or 8.

According to another embodiment of the invention, each one of said inclined side surfaces is configured to serve as an abutment surface of the cutting insert in at least one working position of the cutting insert and abut against a corresponding support surface in an insert seat in a tool body of a milling tool when the cutting insert is mounted in the insert seat in this at least one working position. Thus, one and the same inclined side surface may in one working position of the cutting insert serve as a relief surface for an active main cutting edge and in another working position of the cutting insert serve as an abutment surface of the cutting insert. The two inclined side surfaces on one and the same main side face may be configured to jointly serve as abutment surfaces of the cutting insert in some of the possible working positions of the cutting insert. However, the two inclined side surfaces on one and the same main side face may as an alternative be configured to serve as abutment surfaces of the cutting insert one at a time in different working positions of the cutting insert. In order to ensure a good stability in the contact between an abutment surface formed by one of the inclined side surfaces and the corresponding support surface in an insert seat in a tool body, it is preferred that the sub surfaces of the inclined side surface on both sides of the intermediate chip deflecting member are jointly included in said abutment surface. However, said abutment surface may as an alternative include only one of the two sub surfaces of the inclined side surface in question.

According to another embodiment of the invention, the cutting insert comprises:
a first curved corner cutting edge and a first surface-wiping cutting edge formed at an intersection between the peripheral surface and the first major face, wherein the first main cutting edge, the first curved corner cutting edge and the first surface-wiping cutting edge are arranged one after the other with the first curved corner cutting edge located between the first main cutting edge and the first surface-wiping cutting edge;
a second curved corner cutting edge and a second surface-wiping cutting edge formed at an intersection between the peripheral surface and the second major face, wherein the second main cutting edge, the second curved corner cutting edge and the second surface-wiping cutting edge are arranged one after the other with the second curved corner cutting edge located between the second main cutting edge and the second surface-wiping cutting edge;
a third curved corner cutting edge and a third surface-wiping cutting edge formed at an intersection between the peripheral surface and the first major face, wherein the third main cutting edge, the third curved corner cutting edge and the third surface-wiping cutting edge are arranged one after the other with the third curved corner cutting edge located between the third main cutting edge and the third surface-wiping cutting edge; and a fourth curved corner cutting edge and a fourth surface-wiping cutting edge formed at an intersection between the peripheral surface and the second major face, wherein the fourth main cutting edge, the fourth curved corner cutting edge and the fourth surface-wiping cutting edge are arranged one after the other with the fourth curved corner cutting edge located between the fourth main cutting edge and the fourth surface-wiping cutting edge.

In this case, the cutting insert may have the form of a square-shoulder milling insert or a face milling insert.

Further advantageous features of the double-sided cutting insert according to the present invention will appear from the description following below.

The invention also relates to a milling tool comprising a cutting insert of the above-mentioned type.

Further advantageous features of the milling tool according to the present invention will appear from the description following below.

BRIEF DESCRIPTION OF THE DRAWINGS

With reference to the appended drawings, a specific description of embodiments of the invention cited as examples follows below. In the drawings.

DETAILED DESCRIPTION OF EMBODIMENTS OF THE INVENTION

Three different embodiments of a double-sided cutting insert 1, 1', 1" according to the present invention are illustrated in FIGS. 1a-1h, 2a-2h and 3a-3f. The cutting insert 1, 1', 1" is configured for use in milling and is configured to be used in a milling tool, for instance a milling tool 80 of the type illustrated in FIGS. 4-7.

Figure 1A:
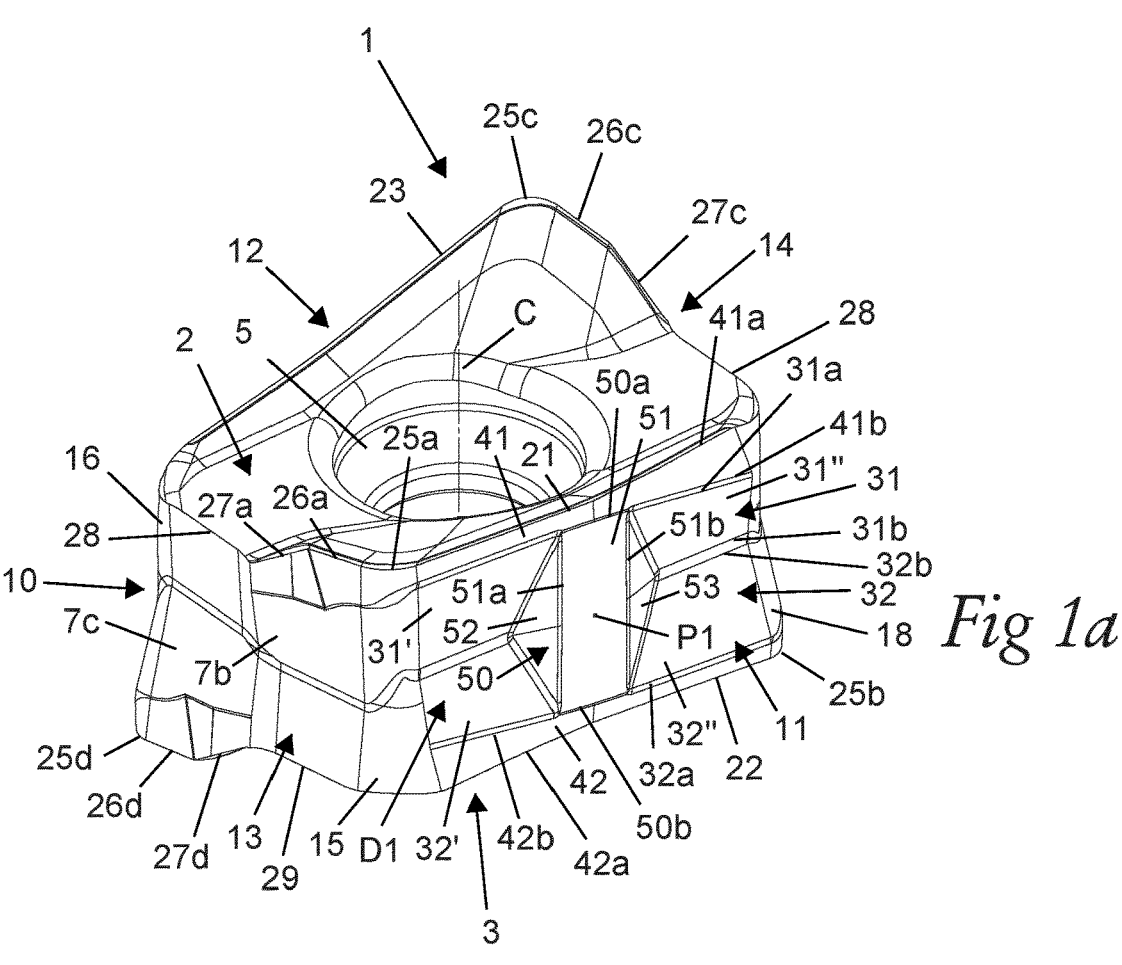
FIGS. 1a-1d are perspective views from different directions of a double-sided cutting insert according to a first embodiment of the present invention.
Figure 1B:
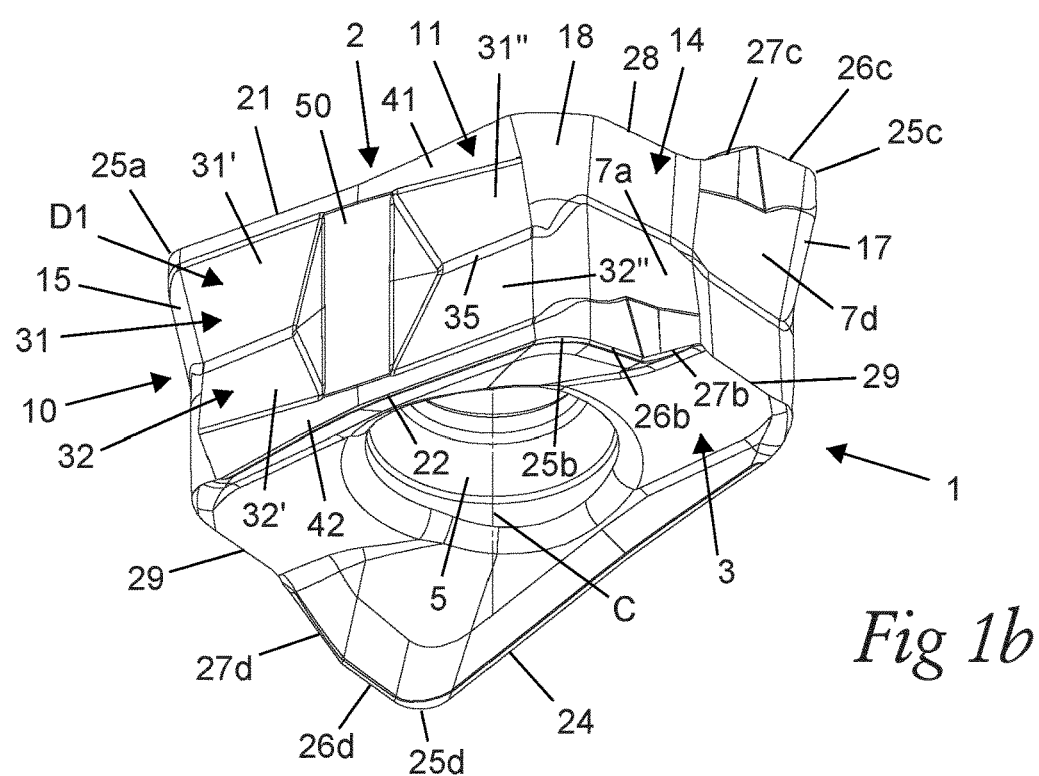
Figure 1C:
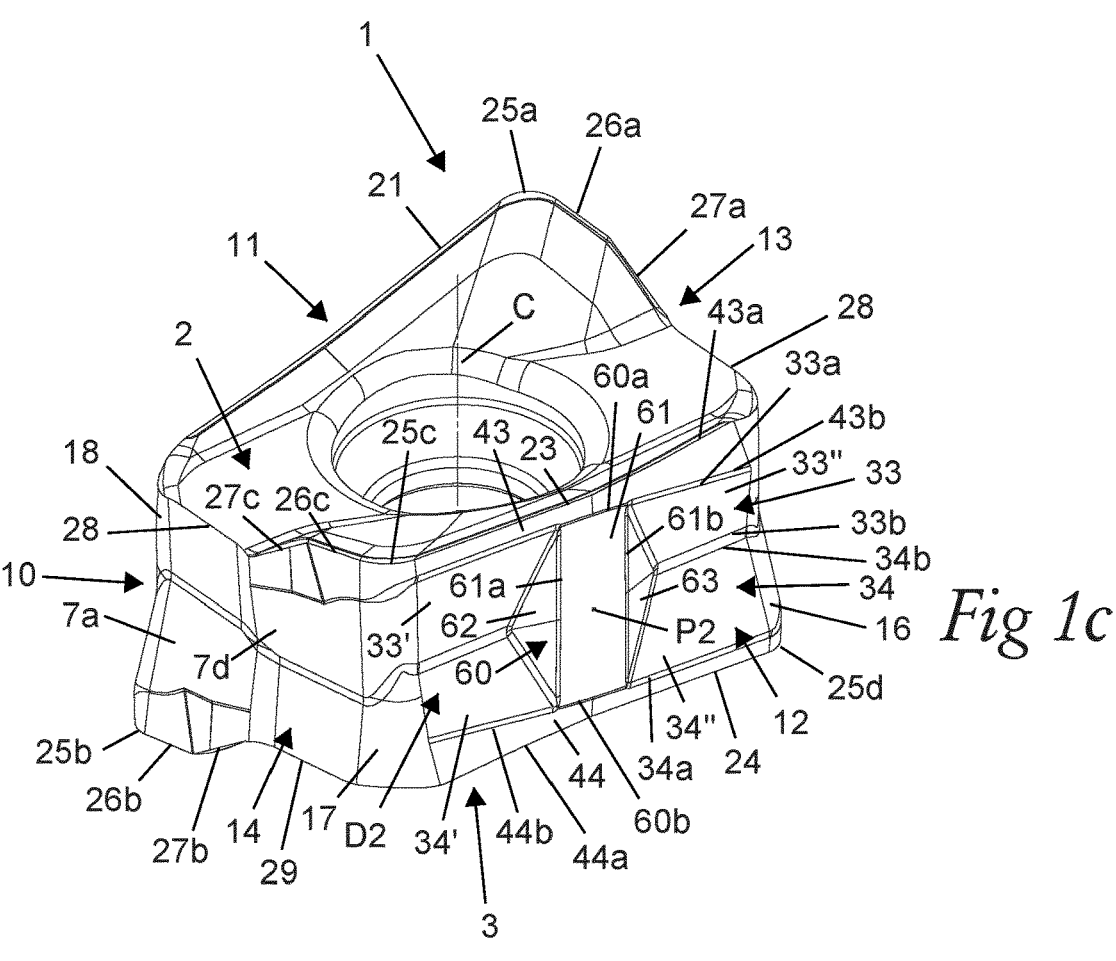
Figure 1D:
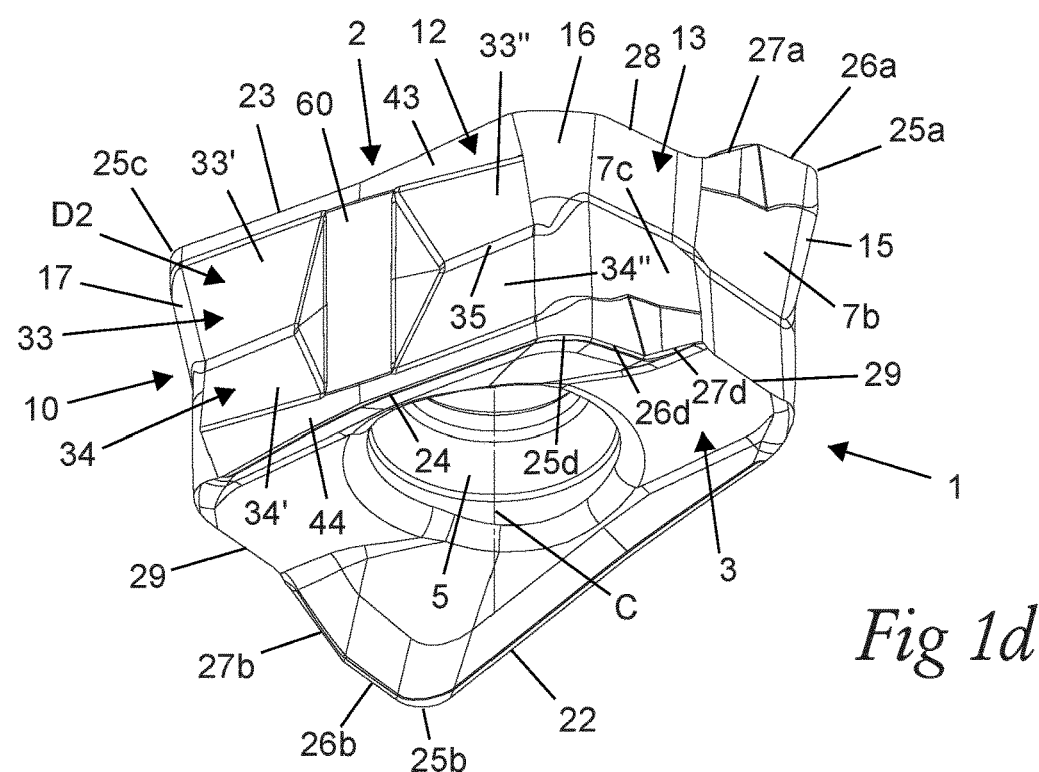
Figure 1E:
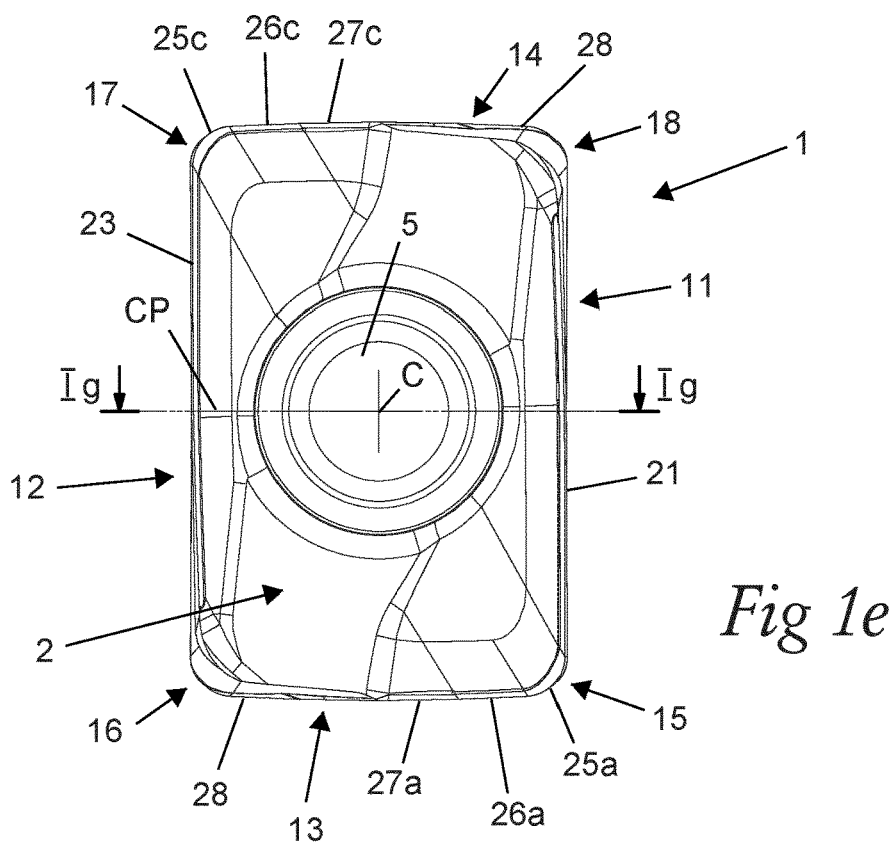
FIG. 1e is a plan view from above of the cutting insert of FIGS. 1a-1d.
Figure 1F:
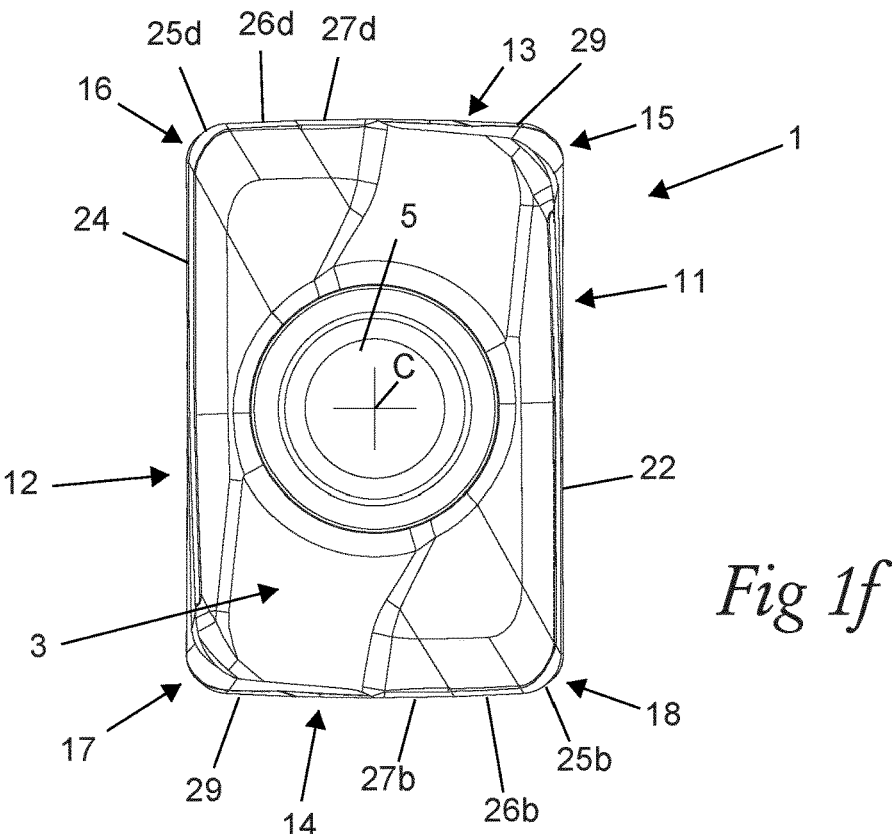
FIG. 1f is a plan view from below of the cutting insert of FIGS. 1a-1d.
Figure 1G:
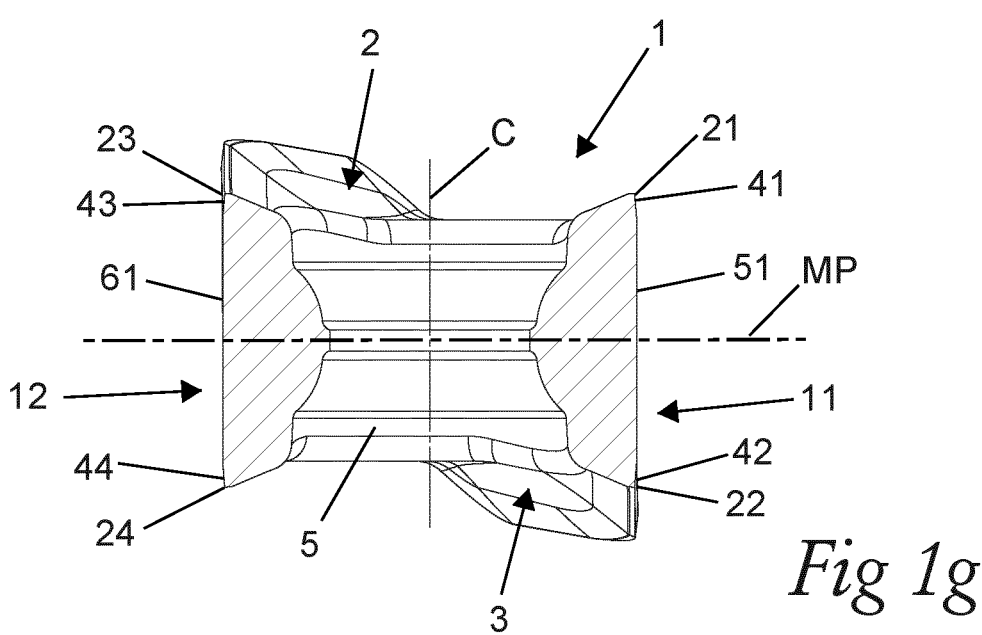
FIG. 1g is a cut according to the line Ig-Ig in FIG. 1e.
Figure 1H:
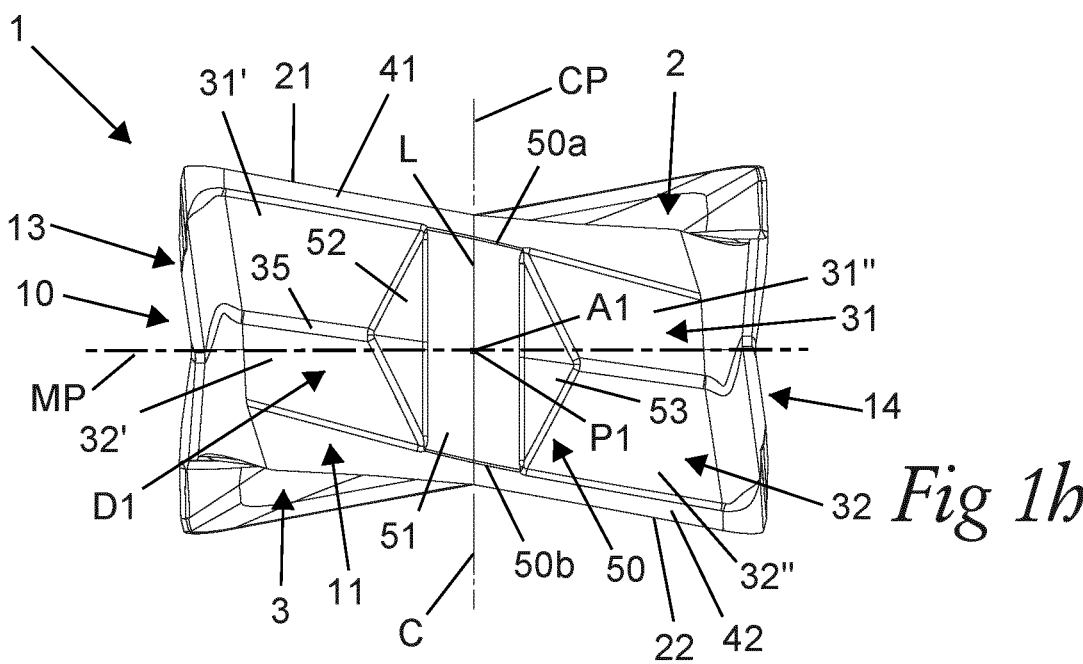
FIG. 1h is a lateral view of the cutting insert of FIGS. 1a-1d, FIGS. 2a-2d are perspective views from different directions of a double-sided cutting insert according to a second embodiment of the invention.
Figures 2A, 2B:
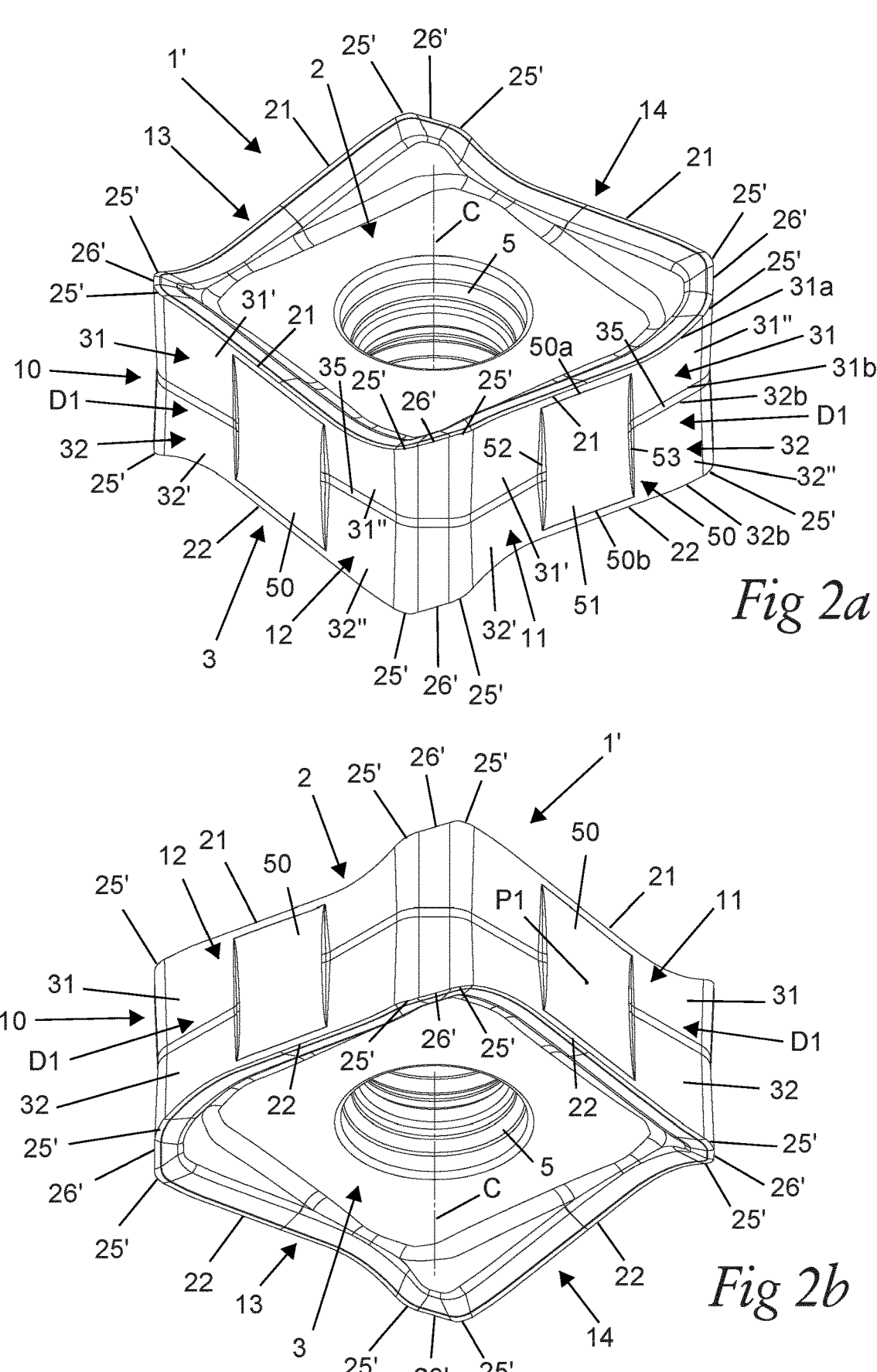
FIG. 2e is a plan view from above of the cutting insert of FIGS. 2a-2d.
FIG. 2f is a plan view from below of the cutting insert of FIGS. 2a-2d.
FIG. 2g is a cut according to the line IIg-IIg in FIG. 2e.
FIG. 2h is a lateral view of the cutting insert of FIGS. 2a-2d, FIGS. 3a and 3b are perspective views from different directions of a double-sided cutting insert according to a third embodiment of the invention.
Figures 2C, 2D:
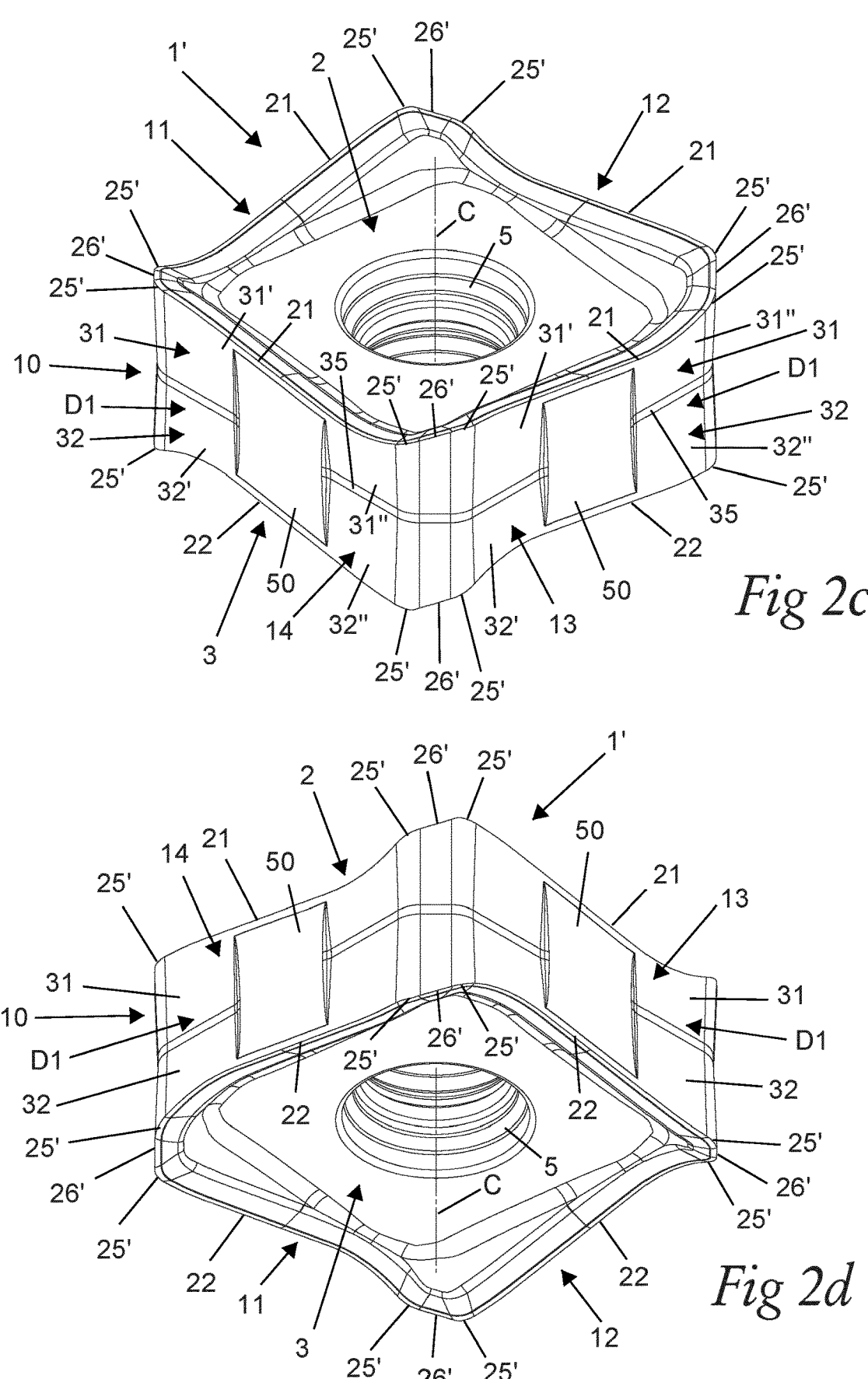
Figures 2E, 2F:
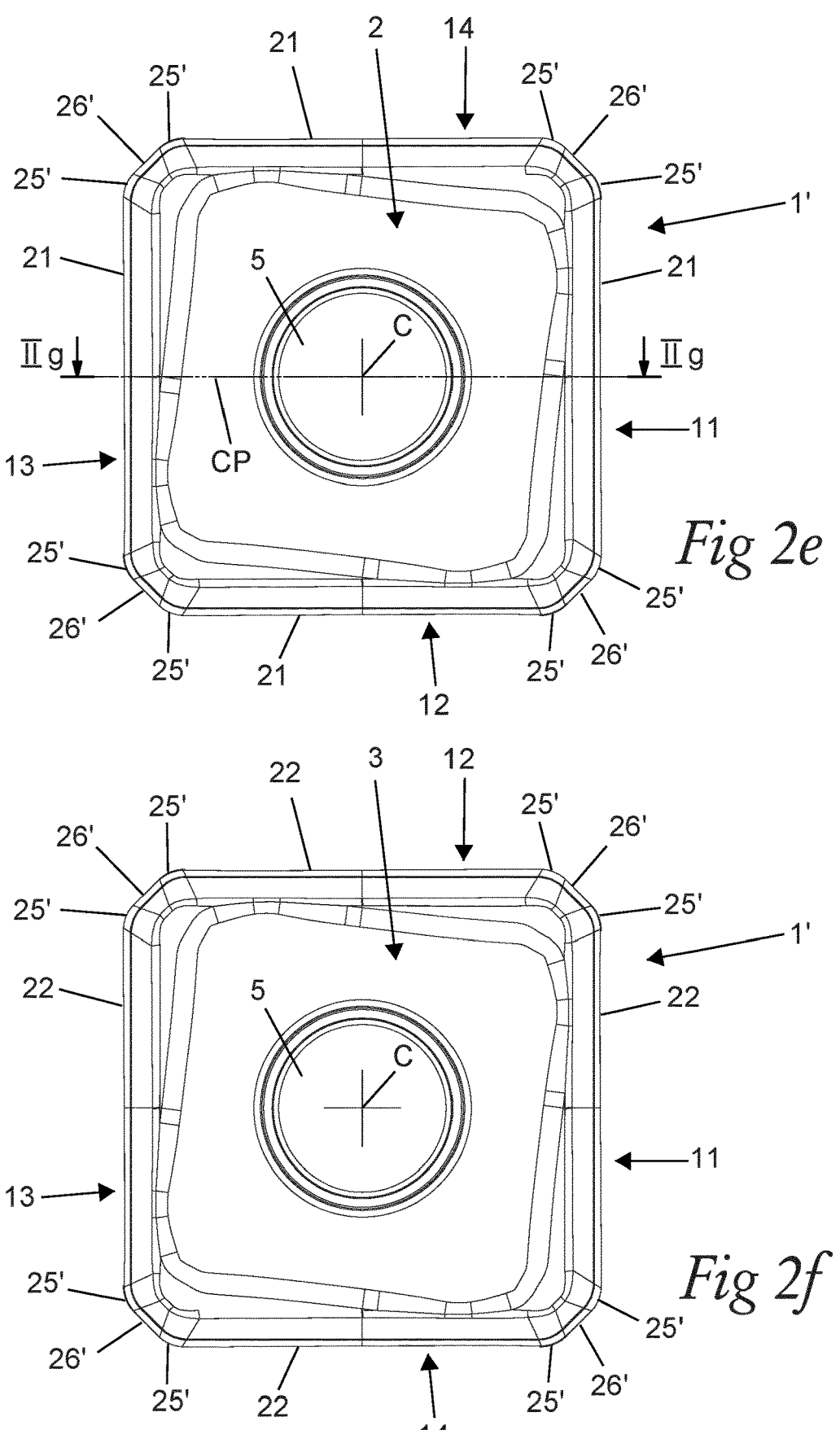
Figure 2G:
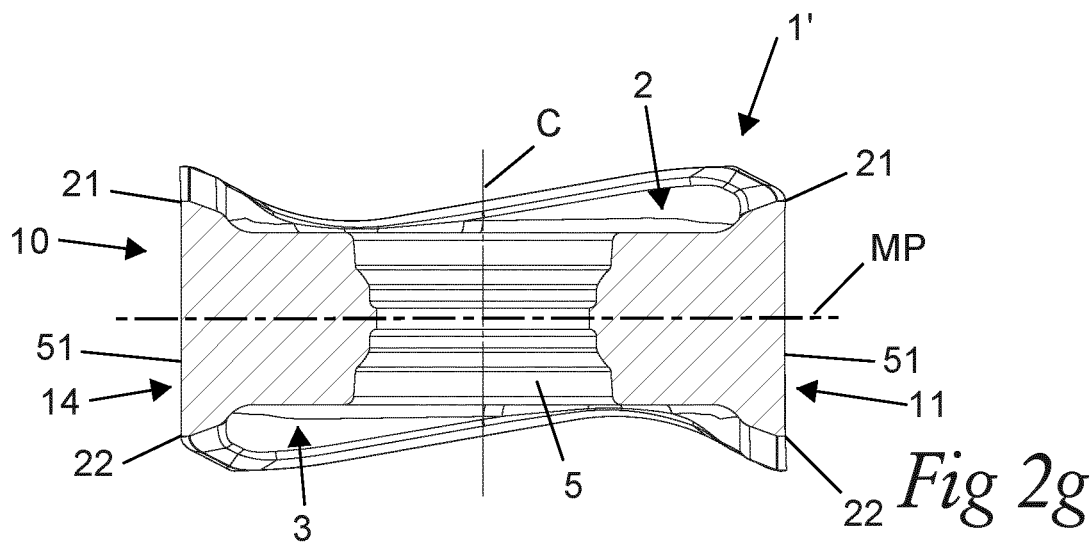
Figure 2H:
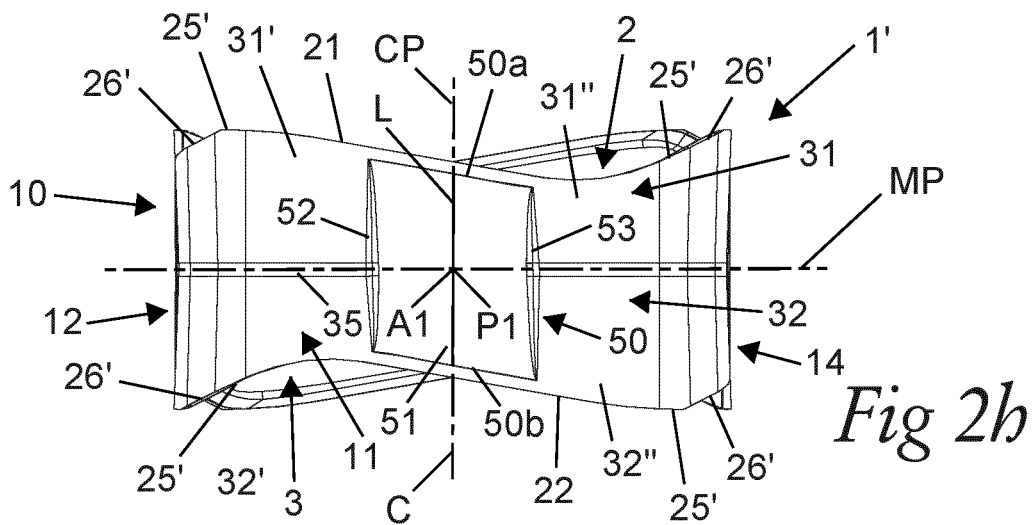
Figure 3A:
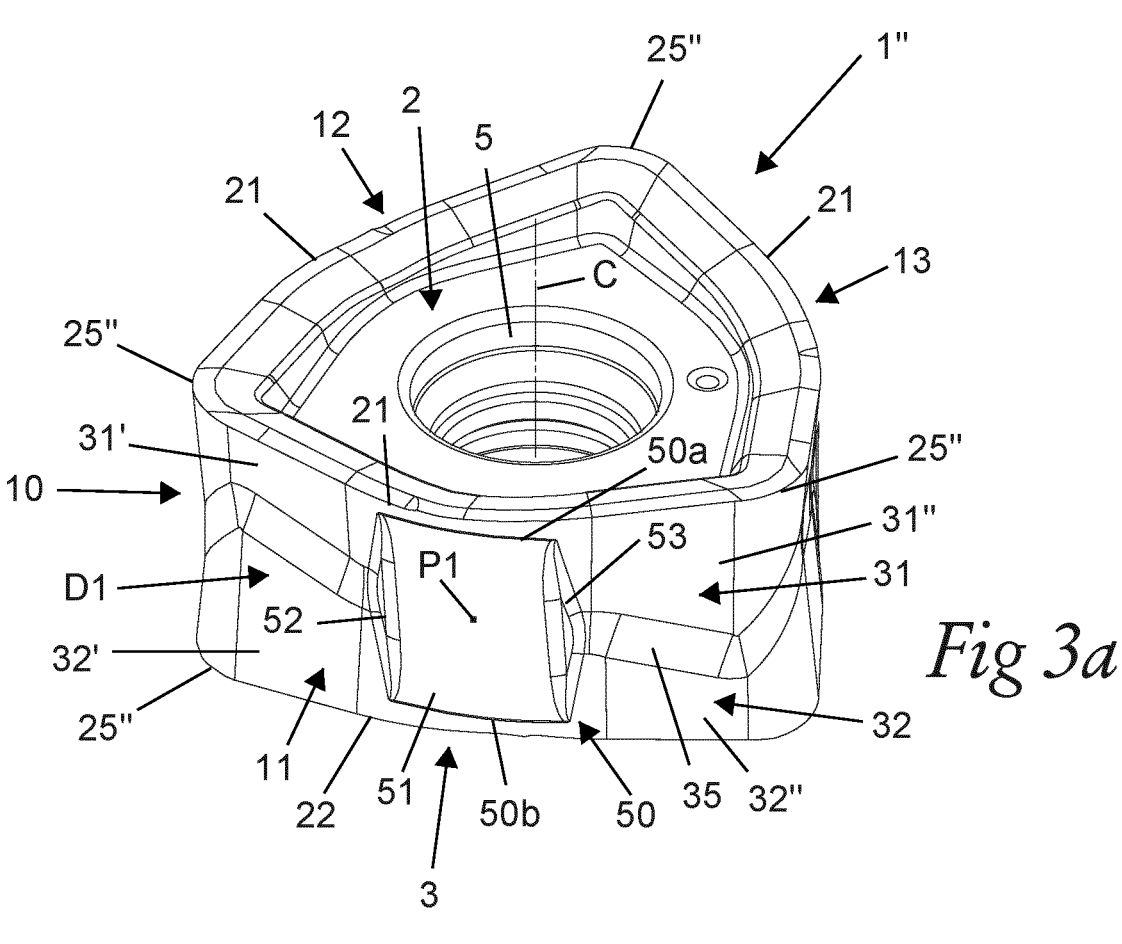
FIG. 3c is a plan view from above of the cutting insert of FIGS. 3a and 3b.
FIG. 3d is a plan view from below of the cutting insert of FIGS. 3a and 3b.
FIG. 3e is a cut according to the line IIIe-IIIe in FIG. 3c.
FIG. 3f is a lateral view of the cutting insert of FIGS. 3a and 3b.
Figure 3B:
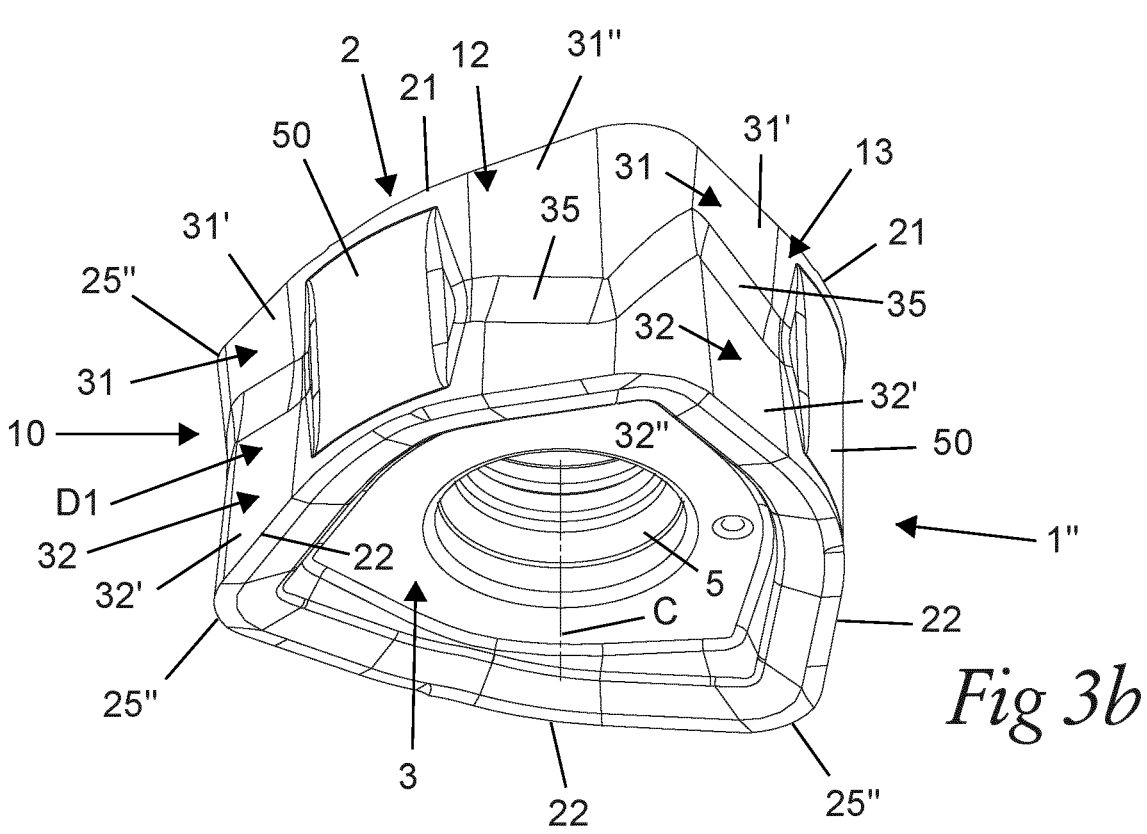
Figure 3C:
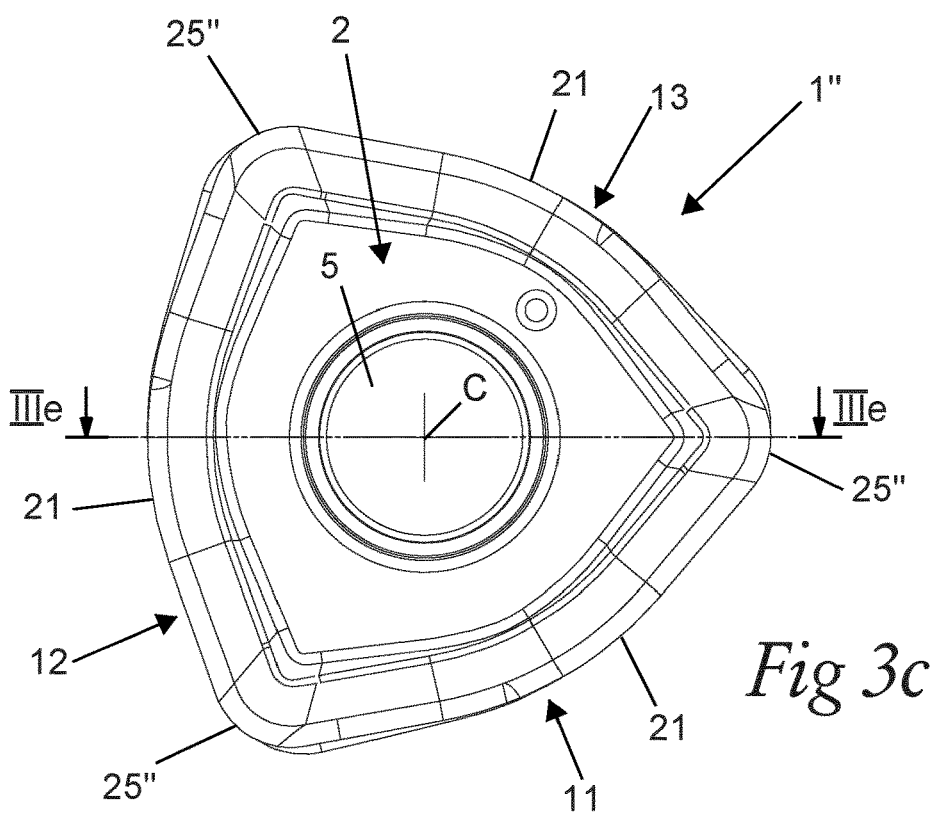
Figure 3D:
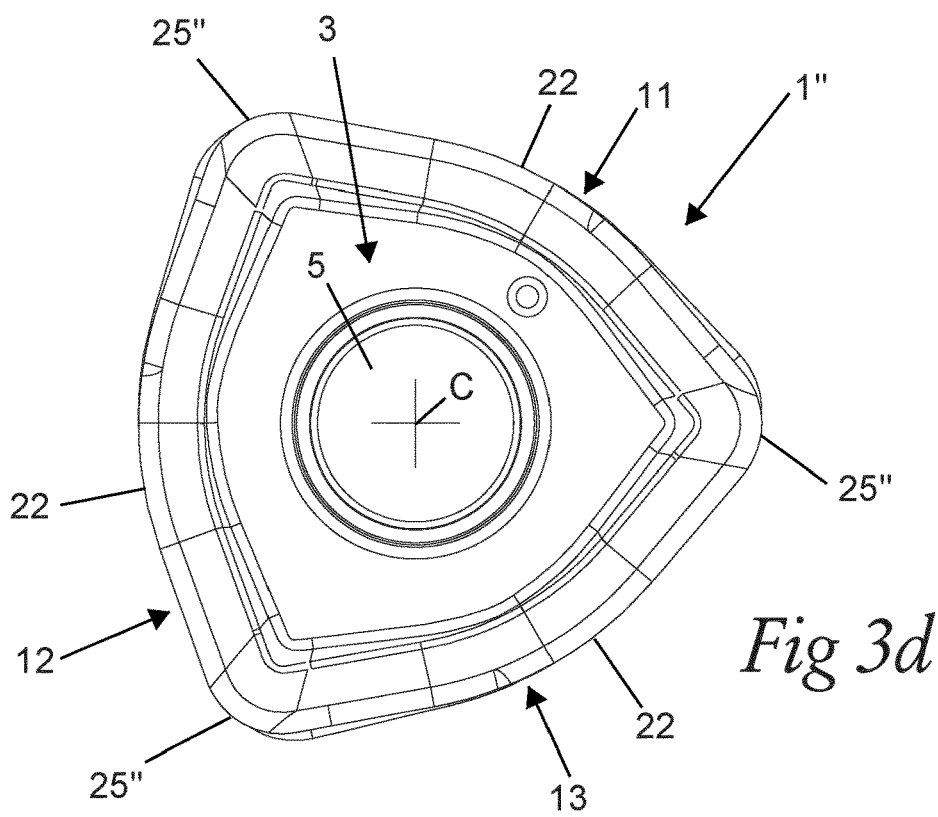
Figure 3E:
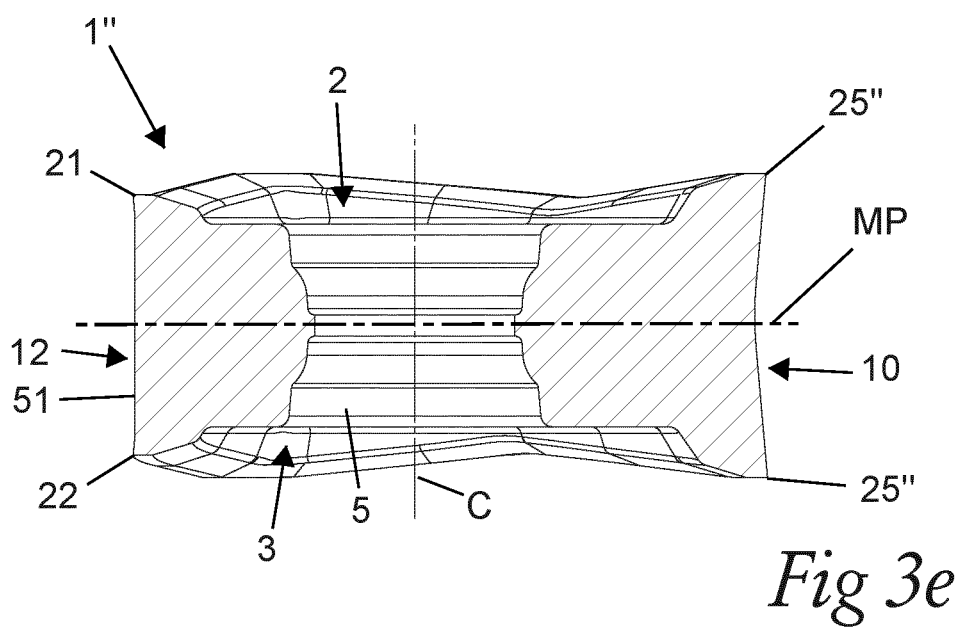
Figure 3F:
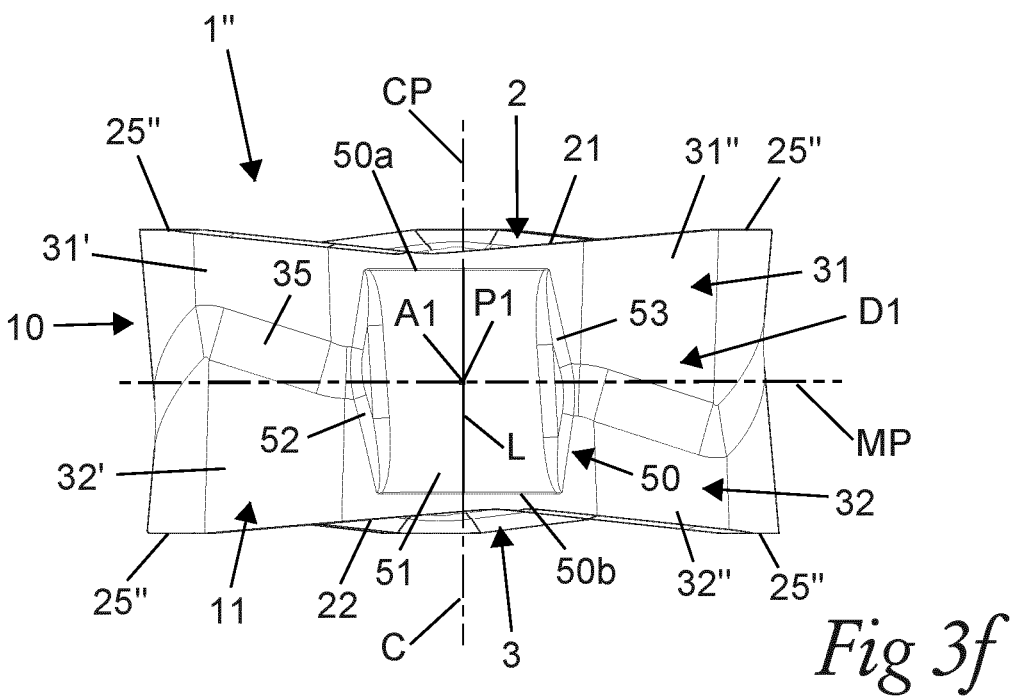
Figure 4:
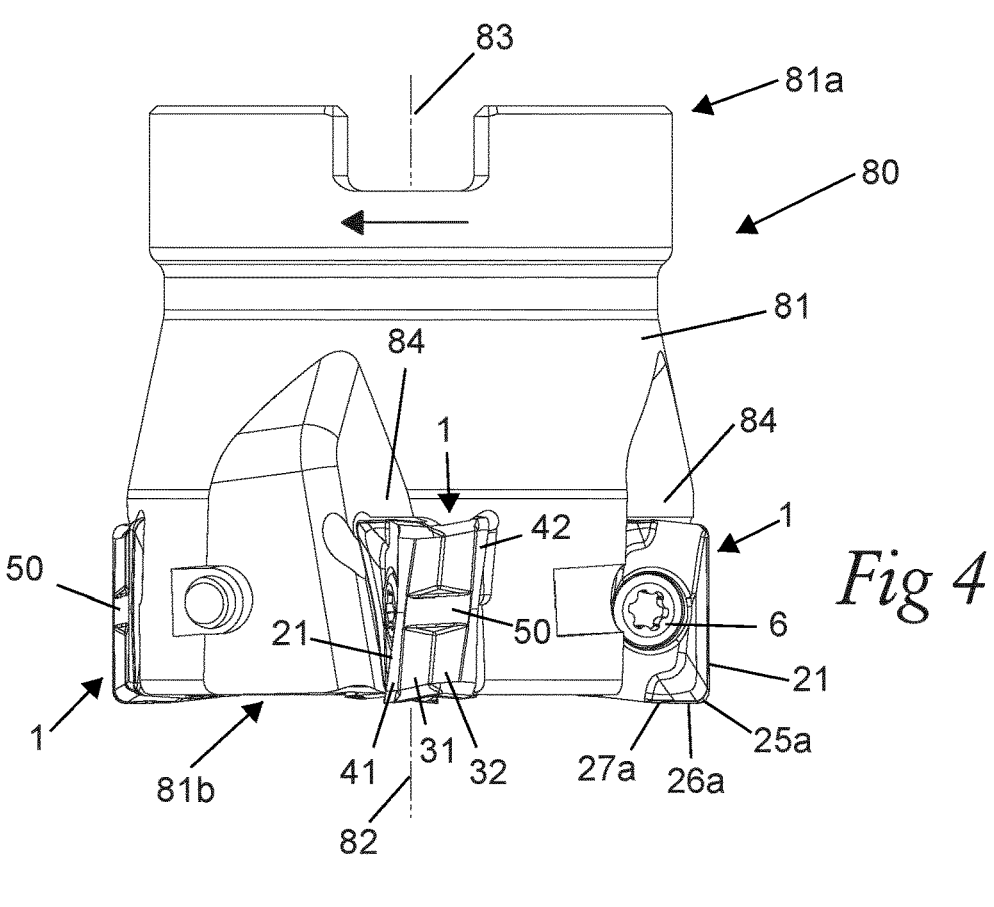
FIG. 4 is a lateral view of a milling tool provided with cutting inserts according to the embodiment illustrated in FIGS. 1a-1h.
Figure 5:
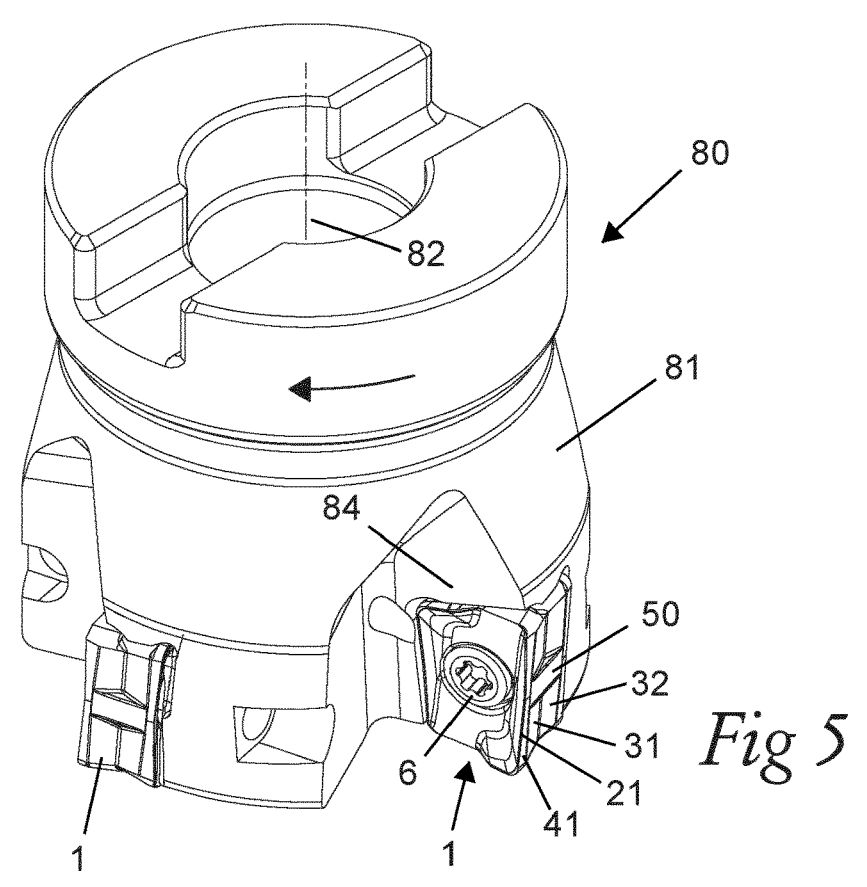
FIG. 5 is a perspective view of the milling tool of FIG. 4.
Figure 6:
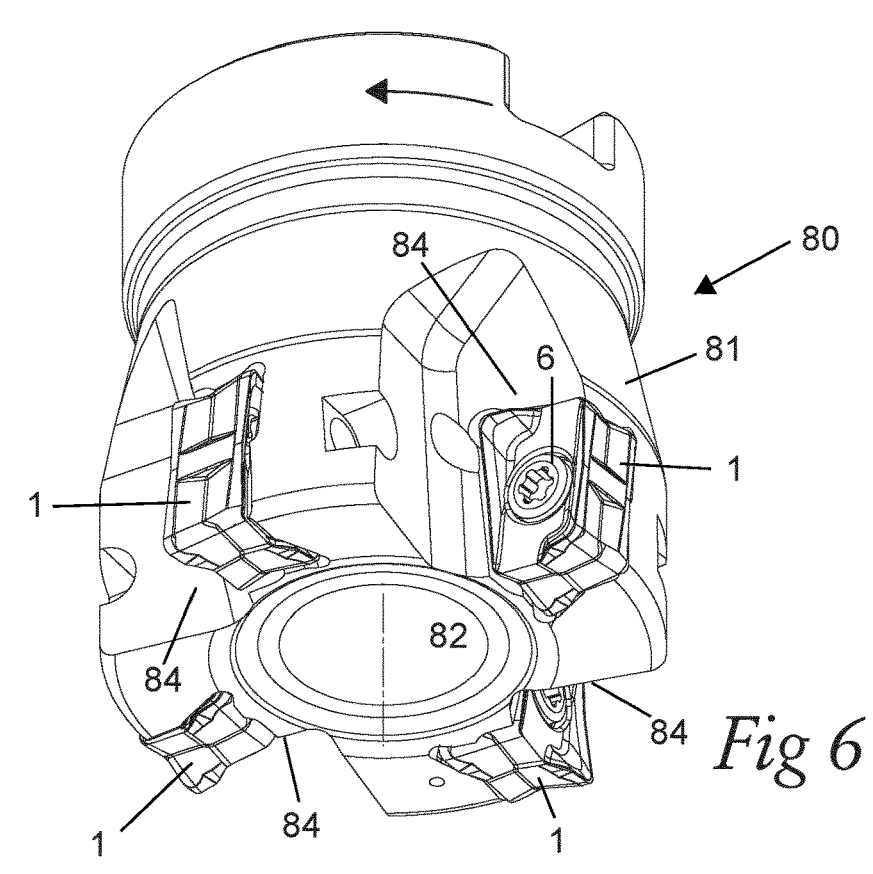
FIG. 6 is a perspective view from another direction of the milling tool of FIG. 4.
Figure 7:
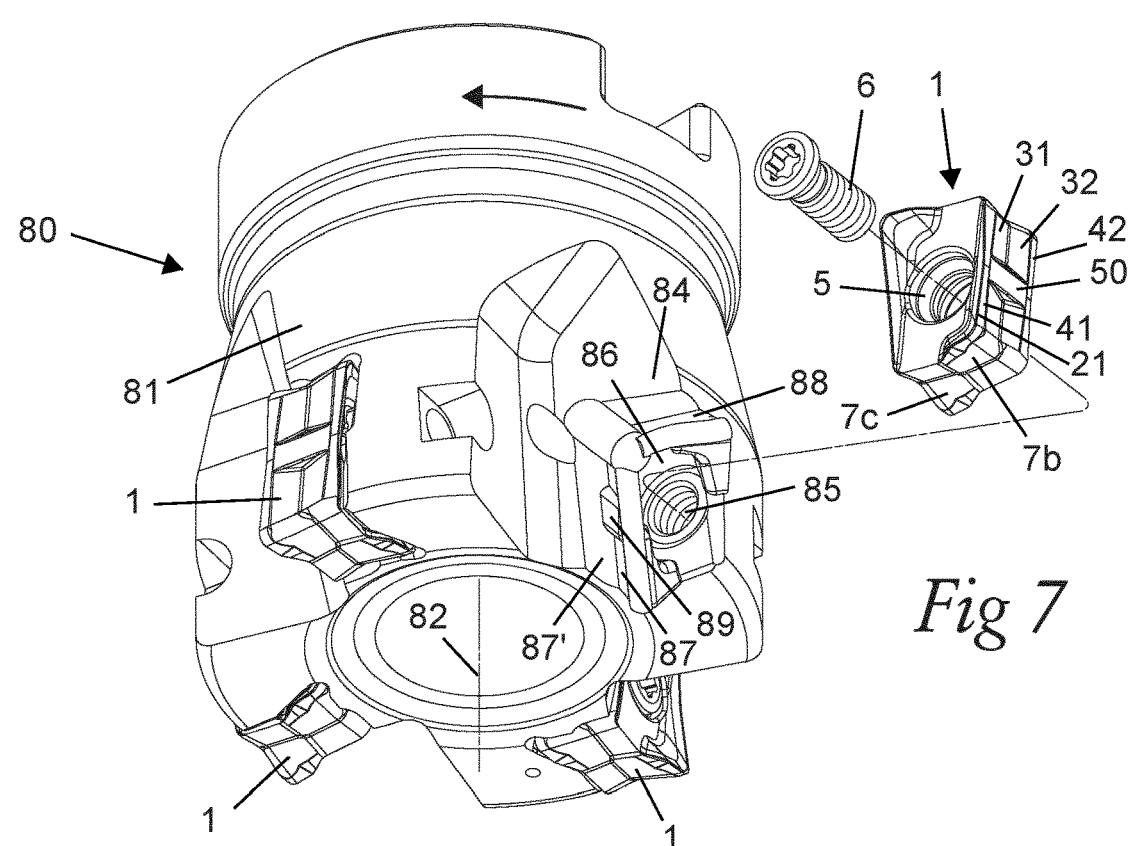
FIG. 7 is a perspective view corresponding to FIG. 6, as seen with a cutting insert removed from its insert seat in the tool body of the milling tool.

The cutting insert 1, 1', 1" has a polygonal basic shape and is turnable into different working positions. The cutting insert 1, 1', 1" comprises first and second major faces 2, 3 arranged on opposite sides of the cutting insert and serving as top and bottom faces of the cutting insert. The first and second major faces 2, 3 have a polygonal shape, or at least essentially polygonal shape, as seen in a plan view of the cutting insert 1, 1', 1". The cutting insert has a centre axis C, which extends between the first and second major faces 2, 3. A median plane MP, which constitutes an imaginary plane, extends halfway between the first and second major faces 2, 3 perpendicularly to the centre axis C, as illustrated in FIGS. 1h, 2h and 3f.

In the illustrated embodiments, the cutting insert 1, 1', 1" is provided with a through hole 5, which extends centrally through the cutting insert between the first and second major faces 2, 3. The through hole 5 is configured to receive a fastening element 6 (see FIGS. 4-7), for instance in the form of a screw, by means of which the cutting insert may be releasably fixed to an insert seat 84 of a milling tool 80. The centre axis C of the cutting insert 1, 1', 1" coincides with the centre axis of the through hole 5. The cutting insert 1, 1', 1" may as an alternative lack a through hole 5, wherein the cutting insert is configured to be releasably fixed to an insert seat of a milling tool by means of suitable clamping means.

A peripheral relief surface 10 extends around the cutting insert 1, 1', 1" between the first and second major faces 2, 3. The peripheral relief surface 10 comprises a first main side face 11, which forms a first peripheral side of the cutting insert. The first main side face 11 has 180° rotational symmetry about an imaginary reference axis A1 (see FIGS. 1h, 2h and 3f) that extends through a centre point P1 of the first main side face 11 and perpendicularly to the centre axis C of the cutting insert. A first main cutting edge 21 is formed at an intersection between the first main side face 11 and the first major face 2 and a second main cutting edge 22 is formed at an intersection between the first main side face 11 and the second major face 3.

A first inclined side surface 31 and a second inclined side surface 32 are formed on the first main side face 11 between the first and second main cutting edges 21, 22. The first inclined side surface 31 is located between the first major face 2 and the second inclined side surface 32 and is configured to form a relief surface for the first main cutting edge 21 in a first one of said working positions. The second inclined side surface 32 is located between the second major face 3 and the first inclined side surface 31 and is configured to form a relief surface for the second main cutting edge 22 in a second one of said working positions. The first inclined side surface 31 is inclined inwards as seen in a direction from a first edge 31a of the first inclined side surface 31 facing the first major face 2 towards an opposite second edge 31b of the first inclined side surface 31 facing the second inclined side surface 32. In a corresponding manner, the second inclined side surface 32 is inclined inwards as seen in a direction from a first edge 32a of the second inclined side surface 32 facing the second major face 3 towards an opposite second edge 32b of the second inclined side surface 32 facing the first inclined side surface 31. The first and second inclined side surfaces 31, 32 are located opposite each other and are inclined towards each other to thereby form a depression D1 on the first main side face 11 between the first and second main cutting edges 21, 22. In the embodiment illustrated in FIGS. 1a-1h, the depression D1 has a V-shaped profile as seen in a section across the depression.

In the illustrated embodiments, the first inclined side surface 31 is separated from the second inclined side surface 32 by an elongated transition area 35, which adjoins to the second edges 31b, 32b of the first and second inclined side surfaces and extends in the circumferential direction of the peripheral surface 10. In the embodiments illustrated in FIGS. 1a-1h and 3a-3f, the transition area 35 extends obliquely in relation to the median plane MP. In the embodiment illustrated in FIGS. 2a-2h, the transition area 35 extends in parallel with the median plane MP.

The cutting insert 1, 1', 1" comprises a first chip deflecting member 50 formed on the first main side face 11 as a protrusion extending across the above-mentioned depression D1, wherein the first chip deflecting member 50 has a first end 50a facing the first main cutting edge 21 and an opposite second end 50b facing the second main cutting edge 22. The first and second inclined side surfaces 31, 32 are both crossed, at least partially, by the first chip deflecting member 50, wherein the first inclined side surface 31 has first and second sub surfaces 31', 31" located on opposite sides of the first chip deflecting member 50 and wherein the second inclined side surface 32 in a corresponding manner has first and second sub surfaces 32', 32" located on opposite sides of the first chip deflecting member 50. In the embodiments illustrated in FIGS. 1a-1h and FIGS. 2a-2h, the first and second sub surfaces 31', 31" of the first inclined side surface 31 are together located in one plane and the first and second sub surfaces 32', 32" of the second inclined side surface 32 are together located in another plane.

The first chip deflecting member 50 comprises a first chip deflecting surface 51 that extends between the first and second ends 50a, 50b of the first chip deflecting member and that is configured to deflect chips that hit the first main side face 11 away from the depression D1. In the illustrated embodiments, the first chip deflecting member 50 also comprises a second chip deflecting surface 52 and a third chip deflecting surface 53 arranged on opposite sides of the first chip deflecting surface 51, wherein the second chip deflecting surface 52 is inclined outwards from the first chip deflecting surface 51 and adjoins to the first sub surfaces 31', 32' of the first and second inclined side surfaces 31, 32, and wherein the third chip deflecting surface 53 is inclined outwards from the first chip deflecting surface 51 and adjoins to the second sub surfaces 31", 32" of the first and second inclined side surfaces 31, 32. In the illustrated embodiments, the second chip deflecting surface 52 adjoins to and extends all along a first longitudinal edge 51a of the first chip deflecting surface 51 and the third chip deflecting surface 53 adjoins to and extends all along an opposite second longitudinal edge 51b of the first chip deflecting surface 51, wherein each one of these first and second longitudinal edges 51a, 51b extends between the first and second ends 50a, 50b of the first chip deflecting member 50. In the embodiment illustrated in FIGS. 1a-1h, the first chip deflecting surface 51 has the shape of a parallelogram and the second and third chip deflecting surfaces 52, 53 are triangular.

The cutting insert 1, 1', 1" has a central plane CP (see FIGS. 1h, 2h and 3f) that contains the centre axis C of the cutting insert and the centre point P1 of the first main side face 11. The first chip deflecting member 50 is preferably arranged at the centre of the first main side face 11, such that the first chip deflecting surface 51 is crossed by the central plane CP along a line of intersection L that extends all the way between the first and second ends 50a, 50b of the first chip deflecting member 50.

In the embodiment illustrated in FIGS. 1a-1h, the relief surface formed by the first inclined side surface 31 in the above-mentioned first working position is configured to serve as a secondary relief surface for the first main cutting edge 21, and the relief surface formed by the second inclined side surface 32 in the above-mentioned second working position is configured to serve as a secondary relief surface for the second main cutting edge 22, wherein a first primary relief surface 41 and a second primary relief surface 42 are formed on the first main side face 11. The first primary relief surface 41 adjoins to the first main cutting edge 21 and is located between the first main cutting edge 21 and the first inclined side surface 31 to thereby serve as a primary relief surface for the first main cutting edge 21 in the first working position. The second primary relief surface 42 adjoins to the second main cutting edge 22 and is located between the second main cutting edge 22 and the second inclined side surface 32 to thereby serve as a primary relief surface for the second main cutting edge 22 in the second working position. In this case, the first chip deflecting surface 51 preferably extends all the way between the first and second primary relief surfaces 41, 42, wherein the first chip deflecting surface 51 adjoins to the first primary relief surface 41 at the first end 50a of the first chip deflecting member 50 and to the second primary relief surface 42 at the second end 50b of the first chip deflecting member 50.

The first primary relief surface 41 has a first longitudinal edge 41a facing or coinciding with the first main cutting edge 21 and an opposite second longitudinal edge 41b facing the first inclined side surface 31. In the corresponding manner, the second primary relief surface 42 has a first longitudinal edge 42a facing or coinciding with the second main cutting edge 22 and an opposite second longitudinal edge 42b facing the second inclined side surface 32. In the embodiment illustrated in FIGS. 1a-1h, the first primary relief surface 41 is inclined outwards as seen in a direction from its first longitudinal edge 41a towards its second longitudinal edge 41b and the second primary relief surface 42 is inclined outwards as seen in a direction from its first longitudinal edge 42a towards its second longitudinal edge 42b. As an alternative, the first and second primary relief surfaces 41, 42 may be perpendicular to the median plan MP, as seen in a section across the first and second primary relief surfaces 41, 42 in parallel with the central plane CP of the cutting insert 1.

The cutting insert 1 illustrated in FIGS. 1a-1h has the form of a square-shoulder milling insert. In this case, the peripheral surface 10 comprises a second main side face 12, which forms a second peripheral side of the cutting insert 1, a third main side face 13, which forms a third peripheral side of the cutting insert 1, and a fourth main side face 14, which forms a fourth peripheral side of the cutting insert 1. The first and second main side faces 11, 12 form a first pair of opposing main side faces and the third and fourth main side faces 13, 14 form a second pair of opposing main side faces.

Thus, the first and second main side faces 11, 12 are located opposite each other on mutually opposite sides of the centre axis C of the cutting insert 1. In the corresponding manner, the third and fourth main side faces 13, 14 are located opposite each other on mutually opposite sides of the centre axis C of the cutting insert 1.

The second main side face 12 is identical, within manufacturing tolerances, to the first main side face 11 and has 180° rotational symmetry about an imaginary reference axis that extends through a centre point P2 of the second main side face 12 and perpendicularly to the centre axis C of the cutting insert. A third main cutting edge 23 is formed at an intersection between the second main side face 12 and the first major face 2 and a fourth main cutting edge 24 is formed at an intersection between the second main side face 12 and the second major face 3.

A third inclined side surface 33 and a fourth inclined side surface 34 are formed on the second main side face 12 between the third and fourth main cutting edges 23, 24. The third inclined side surface 33 is located between the first major face 2 and the fourth inclined side surface 34 and is configured to form a relief surface for the third main cutting edge 23 in a third one of said working positions. The fourth inclined side surface 34 is located between the second major face 3 and the third inclined side surface 33 and is configured to form a relief surface for the fourth main cutting edge 24 in a fourth one of said working positions. The third inclined side surface 33 is inclined inwards as seen in a direction from a first edge 33a of the third inclined side surface 33 facing the first major face 2 towards an opposite second edge 33b of the third inclined side surface 33 facing the fourth inclined side surface 34. In a corresponding manner, the fourth inclined side surface 34 is inclined inwards as seen in a direction from a first edge 34a of the fourth inclined side surface 34 facing the second major face 3 towards an opposite second edge 34b of the fourth inclined side surface 34 facing the third inclined side surface 33. The third and fourth inclined side surfaces 33, 34 are located opposite each other and are inclined towards each other to thereby form a depression D2 on the second main side face 12 between the third and fourth main cutting edges 23, 24.

The cutting insert 1 comprises a second chip deflecting member 60 formed on the second main side face 12 as a protrusion extending across the above-mentioned depression D2, wherein the second chip deflecting member 60 has a first end 60a facing the third main cutting edge 23 and an opposite second end 60b facing the forth main cutting edge 24. The third and fourth inclined side surfaces 33, 34 are both crossed by the second chip deflecting member 60, wherein the third inclined side surface 33 has first and second sub surfaces 33', 33" located on opposite sides of the second chip deflecting member 60 and wherein the fourth inclined side surface 34 in a corresponding manner has first and second sub surfaces 34', 34" located on opposite sides of the second chip deflecting member 60. In the embodiment illustrated in FIGS. 1a-1h, the first and second sub surfaces 33', 33" of the third inclined side surface 33 are together located in one plane and the first and second sub surfaces 34', 34" of the fourth inclined side surface 34 are together located in another plane.

The second chip deflecting member 60 comprises a first chip deflecting surface 61 that extends between the first and second ends 60a, 60b of the second chip deflecting member and that is configured to deflect chips that hit the second main side face 12 away from the depression D2. In the illustrated embodiment, the second chip deflecting member 60 also comprises a second chip deflecting surface 62 and a third chip deflecting surface 63 arranged on opposite sides of the first chip deflecting surface 61, wherein the second chip deflecting surface 62 is inclined outwards from the first chip deflecting surface 61 and adjoins to the first sub surfaces 33', 34' of the third and fourth inclined side surfaces 33, 34, and wherein the third chip deflecting surface 63 is inclined outwards from the first chip deflecting surface 61 and adjoins to the second sub surfaces 33", 34" of the third and fourth inclined side surfaces 33, 34.

In the embodiment illustrated in FIGS. 1a-1h, the relief surface formed by the third inclined side surface 33 in the above-mentioned third working position is configured to serve as a secondary relief surface for the third main cutting edge 23 and the relief surface formed by the fourth inclined side surface 34 in the above-mentioned fourth working position is configured to serve as a secondary relief surface for the fourth main cutting edge 24, wherein a third primary relief surface 43 and a fourth primary relief surface 44 are formed on the second main side face 12. The third primary relief surface 43 adjoins to the third main cutting edge 23 and is located between the third main cutting edge 23 and the third inclined side surface 33 to thereby serve as a primary relief surface for the third main cutting edge 23 in the third working position. The fourth primary relief surface 44 adjoins to the fourth main cutting edge 24 and is located between the fourth main cutting edge 24 and the fourth inclined side surface 34 to thereby serve as a primary relief surface for the fourth main cutting edge 24 in the fourth working position.

In the embodiment illustrated in FIGS. 1a-1h, the peripheral surface 10 also comprises a first corner side surface 15 located between the first and third main side faces 11, 13, a second corner side surface 16 located between the second and third main side faces 12, 13, a third corner side surface 17 located between the third and fourth main side faces 13, 14, and a fourth corner side surface 18 located between the fourth and first main side faces 14, 11. A first curved corner cutting edge 25a extends along the first corner side surface 15 and is formed at an intersection between the first corner side surface 15 and the first major face 2. A second curved corner cutting edge 25b extends along the fourth corner side surface 18 and is formed at an intersection between the fourth corner side surface 18 and the second major face 3. A third curved corner cutting edge 25c extends along the third corner side surface 17 and is formed at an intersection between the third corner side surface 17 and the first major face 2. A fourth curved corner cutting edge 25d extends along the second corner side surface 16 and is formed at an intersection between the second corner side surface 16 and the second major face 3. The first and third curved corner cutting edges 25a, 25c are located diagonally opposite each other on the first major face 2, and the second and fourth curved corner cutting edges 25b, 25d are located diagonally opposite each other on the second major face 3.

In the embodiment illustrated in FIGS. 1a-1h, a first surface-wiping cutting edge 26a and a first ramping cutting edge 27a extend after each other along a part of the third main side face 13 and are formed at an intersection between the third main side face 13 and the first major face 2. A second surface-wiping cutting edge 26b and a second ramping cutting edge 27b extend after each other along a part of the fourth main side face 14 and are formed at an intersection between the fourth main side face 14 and the second major face 3. A third surface-wiping cutting edge 26c and a third ramping cutting edge 27c extend after each other along another part of the fourth main side face 14 and are formed at an intersection between the fourth main side face 14 and the first major face 2. A fourth surface-wiping cutting edge 26d and a fourth ramping cutting edge 27d extend after each other along another part of the third main side face 13 and are formed at an intersection between the third main side face 13 and the second major face 3.

The first curved corner cutting edge 25a extends between the first main cutting edge 21 and the first surface-wiping cutting edge 26a, the second curved corner cutting edge 25b extends between the second main cutting edge 22 and the second surface-wiping cutting edge 26b, the third curved corner cutting edge 25c extends between the third main cutting edge 23 and the third surface-wiping cutting edge 26c, and the fourth curved corner cutting edge 25d extends between the fourth main cutting edge 24 and the fourth surface-wiping cutting edge 26d. The first main cutting edge 21, the first curved corner cutting edge 25a, the first surface-wiping cutting edge 26a and the first ramping cutting edge 27a form a first group of cutting edges, wherein the cutting edges of this first group constitute the active cutting edges of the cutting insert 1 when the cutting insert is in the first working position. The second main cutting edge 22, the second curved corner cutting edge 25b, the second surface-wiping cutting edge 26b and the second ramping cutting edge 27b form a second group of cutting edges, wherein the cutting edges of this second group constitute the active cutting edges of the cutting insert 1 when the cutting insert is in the second working position. The third main cutting edge 23, the third curved corner cutting edge 25c, the third surface-wiping cutting edge 26c and the third ramping cutting edge 27c form a third group of cutting edges, wherein the cutting edges of this third group constitute the active cutting edges of the cutting insert 1 when the cutting insert is in the third working position. The fourth main cutting edge 24, the fourth curved corner cutting edge 25d, the fourth surface-wiping cutting edge 26d and the fourth ramping cutting edge 27d form a fourth group of cutting edges, wherein the cutting edges of this fourth group constitute the active cutting edges of the cutting insert 1 when the cutting insert is in the fourth working position. In the embodiment illustrated in FIGS. 1a-1h, the parts 28 of the peripheral edge of the first major face 2 that extend between the first ramping cutting edge 27a and the third main cutting edge 23 and between the third ramping cutting edge 27c and the first main cutting edge 21 constitute inactive transitions. The parts 29 of the peripheral edge of the second major face 3 that extend between the fourth ramping cutting edge 27d and the second main cutting edge 22 and between the second ramping cutting edge 27b and the fourth main cutting edge 24 also constitute inactive transitions.

FIGS. 4-7 illustrate a milling tool 80 in the form of an end mill tool. The milling tool 80 comprises an elongated tool body 81 and is configured to be rotated about an axis of rotation 82. The tool body 81 has a rear end 81a and an opposite front end 81b. A longitudinal axis 83 of the tool body 81 extends between the rear end 81a and the front end 81b of the tool body, wherein this longitudinal axis 83 coincides with the axis of rotation 82 of the milling tool 80. At the rear end 81a, the tool body 81 is to be mounted to a rotating spindle or the similar of a milling machine, for instance via a tool holder. At the front end 81b, the tool body 81 is provided with insert seats 84 configured to receive cutting inserts 1. In the illustrated example, the tool body 81 is provided with four insert seats 84, which are evenly distributed about the longitudinal axis 83 of the tool body and which are configured to receive cutting inserts 1. However, the tool body 81 may as an alternative, inter alia depending on the diameter of the tool body, be provided with any other suitable number of insert seats 84. A smaller diameter tool body may for instance be provided with two insert seats, whereas a larger diameter tool body may be provided with more than four insert seats.

A cutting insert 1 is mounted in each one of the insert seats 84 in the tool body 81. In the embodiment illustrated in FIGS. 4-7, the milling tool 80 is provided with cutting inserts 1 of the type illustrated in FIGS. 1a-1h. Each cutting insert 1 is configured to be releasably mounted to the associated insert seat 84. In the illustrated embodiment, each cutting insert 1 is fixed to the associated insert seat 84 by means of a fastening element 6 in the form of a screw, which extends through the through hole 5 in the cutting insert 1 and is engaged in a threaded hole 85 (see FIG. 7) in a tangential support surface 86 in the insert seat. The insert seat 84 is also provided with a radial support surface 87 and an axial support surface 88. The cutting insert 1 is provided with at least one radial abutment surface on each one of the first and second main side faces 11, 12 and at least one axial abutment surface 7a-7d on each one of the third and fourth main side faces 13, 14.

A recess 89 is provided in the radial support surface 87, wherein this recess 89 is configured to receive the chip deflecting member 50, 60 provided on the main side face 11, 12 presently facing the radial support surface 87. The recess 89 is so dimensioned that the chip deflecting member 50, 60 is received with play in the recess 89, i.e. without being in contact with any surface in the recess 89 or any other surface in the insert seat 84. In the embodiment illustrated in FIGS. 4-7, the recess 89 has the form of a groove that extends across the radial support surface 87 and divides the radial support surface 87 into two separated sub surfaces.

Each one of the above-mentioned inclined side surfaces 31-34 of the cutting insert 1 illustrated in FIGS. 1a-1h is configured to serve as a radial abutment surface of the cutting insert 1 in at least one working position of the cutting insert and abut against the corresponding radial support surface 87 in the insert seat 84 in the tool body 81 when the cutting insert 1 is mounted in the insert seat 84 in this at least one working position. In the illustrated example:

the fourth inclined side surface 34 abuts against the radial support surface 87 and a first axial abutment surface 7a on the fourth main side face 14 abuts against the axial support surface 88 when the cutting insert 1 is in the first working position;

the third inclined side surface 33 abuts against the radial support surface 87 and a second axial abutment surface 7b on the third main side face 13 abuts against the axial support surface 88 when the cutting insert 1 is in the second working position;

the second inclined side surface 32 abuts against the radial support surface 87 and a third axial abutment surface 7c on the third main side face 13 abuts against the axial support surface 88 when the cutting insert 1 is in the third working position; and the first inclined side surface 31 abuts against the radial support surface 87 and a fourth axial abutment surface 7d on the fourth main side face 14 abuts against the axial support surface 88 when the cutting insert 1 is in the fourth working position.

As an alternative, the third and fourth inclined side surfaces 33, 34 may be configured to jointly serve as abutment surfaces of the cutting insert 1 in the first and second working positions and abut against a respective radial support surface 87, 87' in the insert seat 84, wherein the first and second inclined side surfaces 31, 32 are configured to jointly serve as abutment surfaces of the cutting insert 1 in the third and fourth working positions. As a further alternative, the second sub surfaces 33", 34" of the third and fourth inclined side surfaces 33, 34 may one at a time serve as a radial abutment surface of the cutting insert 1 in the first and second working positions, wherein the second sub surfaces 31", 32" of the first and second inclined side surfaces 31, 32 one at a time serve as a radial abutment surface of the cutting insert 1 in the third and fourth working positions.

The second major face 3, or at least a portion thereof, abuts against the tangential support surface 86 in the insert seat 84 when the cutting insert 1 is in any of the first and third working positions, whereas the first major face 2, or at least a portion thereof, abuts against the tangential support surface 86 when the cutting insert 1 is in any of the second and fourth working positions.

The cutting insert 1, 1', 1" of the invention preferably has 360°/n rotational symmetry about the centre axis C of the cutting insert, where n is an integer having a value of 2 or higher, preferably a value of 2, 3, 4, 5, 6, 7 or 8. In the embodiment illustrated in FIGS. 1*a*-1*h*, the cutting insert 1 has a rectangular basic shape and is turnable into four different working positions, wherein the cutting insert 1 has 180° rotational symmetry about the centre axis C of the cutting insert.

The cutting insert 1' illustrated in FIGS. 2*a*-2*h* has the form of a face milling insert, which has a quadratic basic shape and is turnable into eight different working positions. In this case, the cutting insert 1' has 90° rotational symmetry about the centre axis C of the cutting insert, which implies that the cutting insert 1' has four main side faces 11-14 that are identical to each other, within manufacturing tolerances. Thus, each main side face 11-14 is provided with a first main cutting edge 21 formed at an intersection between the main side face 11-14 and the first major face 2 and a second main cutting edge 22 formed at an intersection between the main side face 11-14 and the second major face 3. Furthermore, a first inclined side surface 31 and a second inclined side surface 32 are formed on each main side face 11-14 between the first and second main cutting edges 21, 22, wherein the first and second inclined side surfaces 31, 32 on each main side face 11-14 are inclined towards each other in the manner described above to form a depression D1 on the main side face 11-14 in question between the first and second main cutting edges 21, 22. A chip deflecting member 50 of the type described above is formed on each main side face 11-14 as a protrusion extending across the depression D1 on the main side face 11-14 in question.

In the embodiment illustrated in FIGS. 2*a*-2*h*, a surface-wiping cutting edge 26' is located at the corner between each pair of mutually adjacent first main cutting edges 21 and at the corner between each pair of mutually adjacent second main cutting edges 22. Each surface-wiping cutting edge 26' is at each of its ends connected to an adjacent main cutting edge 21, 22 via a curved corner cutting edge 25'. Thus, each surface-wiping cutting edge 26' is connected to two curved corner cutting edges 25' arranged on opposite sides of the surface-wiping cutting edge 26'.

In the embodiment illustrated in FIGS. 2*a*-2*h*, each one of the inclined side surfaces 31, 32 on a main side face 11-14 is configured to serve as a radial abutment surface of the cutting insert 1' in at least one working position of the cutting insert and configured to serve as an axial abutment surface of the cutting insert 1' in at least one other working position of the cutting insert.

The cutting insert 1" illustrated in FIGS. 3*a*-3*f* has the form of a high feed milling insert, which has an essentially triangular basic shape and is turnable into six different working positions. In this case, the cutting insert 1" has 120° rotational symmetry about the centre axis C of the cutting insert, which implies that the cutting insert 1" has three main side faces 11-13 that are identical to each other, within manufacturing tolerances. Thus, each main side face 11-13 is provided with a first main cutting edge 21 formed at an intersection between the main side face 11-13 and the first major face 2 and a second main cutting edge 22 formed at an intersection between the main side face 11-13 and the second major face 3. Furthermore, a first inclined side surface 31 and a second inclined side surface 32 are formed on each main side face 11-13 between the first and second main cutting edges 21, 22, wherein the first and second inclined side surfaces 31, 32 on each main side face 11-13 are inclined towards each other in the manner described above to form a depression D1 on the main side face 11-13 in question between the first and second main cutting edges 21, 22. A chip deflecting member 50 of the type described above is formed on each main side face 11-13 as a protrusion extending across the depression D1 on the main side face 11-13 in question.

In the embodiment illustrated in FIGS. 3*a*-3*f*, the first and second main cutting edges 21, 22 and the main side faces 11-13 have a convex shape, as seen in the circumferential direction of the cutting insert 1".

In the embodiment illustrated in FIGS. 3*a*-3*f*, a curved corner cutting edge 25" is located at the corner between each pair of mutually adjacent first main cutting edges 21 and at the corner between each pair of mutually adjacent second main cutting edges 22. Thus, each main cutting edge 21, 22 is at each of its ends connected to an adjacent main cutting edge 21, 22 via a curved corner cutting edge 25".

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A double-sided cutting insert for use in milling, the cutting insert having a polygonal basic shape and being turnable into different working positions, the double-sided cutting insert comprising:

first and second major faces arranged on opposite sides of the cutting insert and serving as top and bottom faces of the cutting insert, each one of the first and second major faces having a polygonal shape as seen in a plan view of the cutting insert;

a centre axis extending between the first and second major faces;

a peripheral surface extending around the cutting insert between the first and second major faces and comprising including at least a first main side face, which forms a first peripheral side of the cutting insert;

a first main cutting edge formed at an intersection between the first main side face and the first major face;

a second main cutting edge formed at an intersection between the first main side face and the second major face;

a first inclined side surface and a second inclined side surface formed on the first main side face, wherein the first inclined side surface is located between the first major face and the second inclined side surface and is configured to form a relief surface for the first main cutting edge in a first one of said working positions and the second inclined side surface is located between the second major face and the first inclined side surface and is configured to form a relief surface for the second main cutting edge in a second one of said working positions, the first inclined side surface being inclined inwards as seen in a direction from a first edge of the first inclined side surface facing the first major face towards an opposite second edge of the first inclined side surface facing the second inclined side surface and the second inclined side surface being inclined inwards as seen in a direction from a first edge of the second inclined side surface facing the second major face towards an opposite second edge of the second inclined side surface facing the first inclined side surface, and wherein the first and second inclined side surfaces are located opposite each other and are inclined towards each other to thereby form a depression on the first main side face between the first and second main cutting edges ; and a first chip deflecting member formed on the first main side face as a protrusion extending across the depression formed by the first and second inclined side surfaces, wherein the first chip deflecting member has a first end facing the first main cutting edge, an opposite second end facing the second main cutting edge and at least a first chip deflecting surface that extends between said first and second ends and that is configured to deflect chips that hit the first main side face away from said depression, and wherein each one of the first and second inclined side surfaces includes a first sub surface located on a first side of the first chip deflecting member and a second sub surface located on an opposite second side of the first chip deflecting member.

2. The double-sided cutting insert according to claim 1, wherein the first chip deflecting member includes a second chip deflecting surface and a third chip deflecting surface arranged on opposite sides of the first chip deflecting surface, wherein the second chip deflecting surface is inclined outwards from the first chip deflecting surface and adjoins to the first sub surface of the first inclined side surface and to the first sub surface of the second inclined side surface, and wherein the third chip deflecting surface is inclined outwards from the first chip deflecting surface and adjoins to the second sub surface of the first inclined side surface and to the second sub surface of the second inclined side surface.

3. The double-sided cutting insert according to claim 2, wherein the first chip deflecting surface has a first longitudinal edge extending between the first and second ends of the first chip deflecting member and an opposite second longitudinal edge extending between the first and second ends of the first chip deflecting member, wherein the second chip deflecting surface adjoins to and extends all along the first longitudinal edge of the first chip deflecting surface, and wherein the third chip deflecting surface adjoins to and extends all along the second longitudinal edge of the first chip deflecting surface.

4. The double-sided cutting insert according to claim 2, wherein the first chip deflecting surface has the shape of a parallelogram and that the second and third chip deflecting surfaces are triangular.

5. The double-sided cutting insert according to claim 1, wherein the first main side face has 180° rotational symmetry about an imaginary reference axis that extends through a centre point of the first main side face and perpendicularly to the centre axis of the cutting insert.

6. The double-sided cutting insert according to claim 1, wherein the relief surface formed by the first inclined side surface in said first working position is configured to serve as a secondary relief surface for the first main cutting edge, wherein a first primary relief surface is formed on the first main side face, the first primary relief surface adjoining to the first main cutting edge and being located between the first main cutting edge and the first inclined side surface to thereby serve as a primary relief surface for the first main cutting edge in said first working position, wherein the relief surface formed by the second inclined side surface in said second working position is configured to serve as a secondary relief surface for the second main cutting edge, and wherein a second primary relief surface is formed on the first main side face, the second primary relief surface adjoining to the second main cutting edge and being located between the second main cutting edge and the second inclined side surface to thereby serve as a primary relief surface for the second main cutting edge in said second working position.

7. The double-sided cutting insert according to claim 6, wherein the first chip deflecting surface adjoins to the first primary relief surface at the first end of the first chip deflecting member and to the second primary relief surface at the second end of the first chip deflecting member.

8. The double-sided cutting insert according to claim 6, wherein the cutting insert has a median plan that extends halfway between the first and second major faces perpendicularly to the centre axis of the cutting insert, wherein each one of the first and second primary relief surfaces is perpendicular to said median plan, as seen in a section across the first and second primary relief surfaces in parallel with a central plane of the cutting insert that contains the centre axis of the cutting insert and a centre point of the first main side face, or wherein the first primary relief surface is inclined outwards as seen in a direction from a first longitudinal edge of the first primary relief surface facing or coinciding with the first main cutting edge towards an opposite second longitudinal edge of the first primary relief surface facing the first inclined side surface, and wherein the second primary relief surface is inclined outwards as seen in a direction from a first longitudinal edge of the second primary relief surface facing or coinciding with the second main cutting edge towards an opposite second longitudinal edge of the second primary relief surface facing the second inclined side surface.

9. The double-sided cutting insert according to claim 1, further comprising a through hole extending centrally through the cutting insert between the first and second major faces, wherein a centre axis of the through hole coincides with the centre axis of the cutting insert, and wherein the first chip deflecting member is arranged at the centre of the first main side face.

10. The double-sided cutting insert according to claim 9, further comprising a central plane that contains the centre axis of the cutting insert and a centre point of the first main side face, wherein the first chip deflecting surface is crossed by the central plane along a line of intersection that extends all the way between the first and second ends of the first chip deflecting member.

11. The double-sided cutting insert according to claim 1, wherein the peripheral surface includes a second main side face, which forms a second peripheral side of the cutting insert, wherein a third main cutting edge is formed at an intersection between the second main side face and the first major face, wherein a fourth main cutting edge is formed at an intersection between the second main side face and the second major face, wherein a third inclined side surface and a fourth inclined side surface are formed on the second main side face, wherein the third inclined side surface is located between the first major face and the fourth inclined side surface and is configured to form a relief surface for the third main cutting edge in a third one of said working positions and the fourth inclined side surface is located between the second major face and the third inclined side surface and is configured to form a relief surface for the fourth main cutting edge in a fourth one of said working positions, the third inclined side surface being inclined inwards as seen in a direction from a first edge of the third inclined side surface facing the first major face towards an opposite second edge of the third inclined side surface facing the fourth inclined side surface and the fourth inclined side surface being inclined inwards as seen in a direction from a first edge of the fourth inclined side surface facing the second major face towards an opposite second edge of the fourth inclined side surface facing the third inclined side surface, wherein the third and fourth inclined side surfaces are located opposite each other and are inclined towards each other to thereby form a depression on the second main side face between the third and fourth main cutting edges, a second chip deflecting member formed on the second main side face as a protrusion extending across the depression formed by the third and fourth inclined side surfaces, wherein the second chip deflecting member has a first end facing the third main cutting edge, an opposite second end facing the fourth main cutting edge and at least a first chip deflecting surface that extends between said first and second ends of the second chip deflecting member and that is configured to deflect chips that hit the second main side face away from the depression formed by the third and fourth inclined side surfaces, and wherein each one of the third and fourth inclined side surfaces includes a first sub surface located on a first side of the second chip deflecting member and a second sub surface located on an opposite second side of the second chip deflecting member.

12. The double-sided cutting insert according to claim 11, wherein the first and second main side faces are located opposite each other on opposite sides of the centre axis of the cutting insert.

13. The double-sided cutting insert according to claim 11, wherein each one of said inclined side surfaces is configured to serve as an abutment surface of the cutting insert in at least one working position of the cutting insert and abut against a corresponding support surface in an insert seat in a tool body of a milling tool when the cutting insert is mounted in the insert seat in this at least one working position.

14. The double-sided cutting insert according to claim 11, further comprising a first curved corner cutting edge and a first surface-wiping cutting edge formed at an intersection between the peripheral surface and the first major face, wherein the first main cutting edge, the first curved corner cutting edge and the first surface-wiping cutting edge are arranged one after the other with the first curved corner cutting edge located between the first main cutting edge and the first surface-wiping cutting edge, a second curved corner cutting edge and a second surface-wiping cutting edge being formed at an intersection between the peripheral surface and the second major face, wherein the second main cutting edge, the second curved corner cutting edge and the second surface-wiping cutting edge are arranged one after the other with the second curved corner cutting edge located between the second main cutting edge and the second surface-wiping cutting edge, a third curved corner cutting edge and a third surface-wiping cutting edge being formed at an intersection between the peripheral surface and the first major face, wherein the third main cutting edge, the third curved corner cutting edge and the third surface-wiping cutting edge are arranged one after the other with the third curved corner cutting edge located between the third main cutting edge and the third surface-wiping cutting edge, and a fourth curved corner cutting edge and a fourth surface-wiping cutting edge formed at an intersection between the peripheral surface and the second major face, wherein the fourth main cutting edge, the fourth curved corner cutting edge and the fourth surface-wiping cutting edge are arranged one after the other with the fourth curved corner cutting edge located between the fourth main cutting edge and the fourth surface-wiping cutting edge.

15. The double-sided cutting insert according to claim 1, wherein the cutting insert is a square-shoulder milling insert or a face milling insert.

16. The double-sided cutting insert according to claim 1, wherein the cutting insert has $360°/n$ rotational symmetry about the centre axis of the cutting insert, where n is an integer having a value of 2 or higher.

17. A milling tool comprising at least one double-sided cutting insert according to claim 1.

* * * * *